(12) United States Patent
Giraldo et al.

(10) Patent No.: US 10,239,016 B2
(45) Date of Patent: Mar. 26, 2019

(54) SYSTEMS AND METHODS FOR NITROGEN RECOVERY FROM A GAS STREAM

(71) Applicant: NUORGANICS LLC, Robbinsville, NJ (US)

(72) Inventors: Eugenio Giraldo, Robbinsville, NJ (US); Barbara Jean Wingler, Robbinsville, NJ (US)

(73) Assignee: NUORGANICS LLC, Robbinsville, NJ (US)

( * ) Notice: Subject to any disclaimer, the term of this patent is extended or adjusted under 35 U.S.C. 154(b) by 0 days.

(21) Appl. No.: 15/832,213

(22) Filed: Dec. 5, 2017

(65) Prior Publication Data
US 2018/0154306 A1    Jun. 7, 2018

Related U.S. Application Data

(60) Provisional application No. 62/431,246, filed on Dec. 7, 2016.

(51) Int. Cl.
*B01D 53/58*      (2006.01)
*B01D 53/79*      (2006.01)
(Continued)

(52) U.S. Cl.
CPC ............. *B01D 53/58* (2013.01); *B01D 53/18* (2013.01); *B01D 53/263* (2013.01);
(Continued)

(58) Field of Classification Search
CPC ........ B01D 53/58; B01D 53/78; B01D 53/79; B01D 53/346; B01D 53/263; B01D 53/18;
(Continued)

(56) References Cited

U.S. PATENT DOCUMENTS

| | | |
|---|---|---|
| 1,310,306 A | 7/1919 | Sperr, Jr. |
| 2,822,245 A | 2/1958 | Shipman et al. |

(Continued)

FOREIGN PATENT DOCUMENTS

| | | |
|---|---|---|
| AP | 200102075 | 3/2001 |
| AT | 254225 B | 5/1967 |

(Continued)

*Primary Examiner* — Timothy C Vanoy
(74) *Attorney, Agent, or Firm* — Lando & Anastasi, LLP

(57) ABSTRACT

Methods of producing a treated gas by removing nitrogenous compounds are disclosed. Methods of recovering ammonia from a gas stream having nitrogenous compounds are disclosed. Methods of producing a fertilizer product from organic waste are disclosed. The methods may include introducing aqueous sulfurous acid into a gas stream having nitrogenous compounds to absorb the nitrogenous compounds in a liquid and produce a treated gas. The methods may also include maintaining the pH of certain solutions above 5 or introducing an oxidant into certain solutions to produce sulfate ions. Systems for removing nitrogenous compounds including a reaction subsystem, a solids-liquid separator, a temperature control subsystem, an oxidation control subsystem, and a recirculation line are also disclosed. The systems may be employed to remove nitrogenous compounds from a gas stream, recover the ammonia from the gas stream, or produce a fertilizer product from the recovered ammonia.

44 Claims, 14 Drawing Sheets

(51) Int. Cl.
*B01D 53/26* (2006.01)
*B01D 53/34* (2006.01)
*B01D 53/18* (2006.01)
*B01D 53/78* (2006.01)

(52) U.S. Cl.
CPC ........... *B01D 53/346* (2013.01); *B01D 53/78* (2013.01); *B01D 53/79* (2013.01); B01D 2251/10 (2013.01); B01D 2251/508 (2013.01); B01D 2258/0266 (2013.01)

(58) Field of Classification Search
CPC .......... B01D 2251/10; B01D 2251/508; B01D 2258/0266; B01D 2251/506; B01D 2257/406; B01D 2257/40; A01K 1/00; A01K 1/0047; A01K 1/0082; C02F 1/586; C02F 2101/16; C02F 2103/20
See application file for complete search history.

(56) References Cited

U.S. PATENT DOCUMENTS

| | | | |
|---|---|---|---|
| 3,036,417 A | 5/1962 | Melin, Jr. | |
| 3,226,201 A | 12/1965 | Harmon | |
| 3,369,869 A | 2/1968 | Wilhelm | |
| 3,607,022 A | 9/1971 | Hausweiler et al. | |
| 3,627,134 A | 12/1971 | Mattson | |
| 3,644,092 A | 2/1972 | Campbell | |
| 3,739,551 A | 6/1973 | Eckert | |
| 3,785,127 A | 1/1974 | Mare | |
| 3,879,530 A | 4/1975 | Perret et al. | |
| 3,907,510 A | 9/1975 | Collins | |
| 3,969,479 A | 7/1976 | Lonnes et al. | |
| 3,991,161 A | 11/1976 | Saitoh et al. | |
| 3,992,508 A | 11/1976 | Saitoh et al. | |
| 4,009,250 A | 2/1977 | Novozhilov et al. | |
| 4,039,289 A | 8/1977 | Collins et al. | |
| 4,046,867 A | 9/1977 | Seeling et al. | |
| 4,058,375 A | 11/1977 | Lawrence | |
| 4,107,268 A | 8/1978 | O'Neill et al. | |
| 4,183,902 A | 1/1980 | Hashimoto et al. | |
| 4,223,614 A | 9/1980 | Barkhuus et al. | |
| 4,269,812 A | 5/1981 | Edwards et al. | |
| 4,271,134 A | 6/1981 | Teller | |
| 4,287,162 A | 9/1981 | Scheibel | |
| 4,343,771 A | 8/1982 | Edwards et al. | |
| 4,405,354 A * | 9/1983 | Thomas, II | A01K 1/0152 71/21 |
| 4,425,313 A | 1/1984 | Cooper | |
| 4,437,867 A | 3/1984 | Lemer | |
| 4,526,771 A | 7/1985 | Forbush et al. | |
| 4,948,402 A | 8/1990 | Davis | |
| 4,966,757 A | 10/1990 | Lewis et al. | |
| 4,994,245 A | 2/1991 | Murray et al. | |
| 5,160,707 A | 11/1992 | Murray et al. | |
| 5,308,589 A | 5/1994 | Yung | |
| RE35,234 E | 5/1996 | Davis | |
| 5,595,713 A | 1/1997 | Gohara et al. | |
| 5,614,102 A | 3/1997 | Sakurada | |
| 5,674,459 A | 10/1997 | Gohara et al. | |
| 5,814,292 A | 9/1998 | Foster et al. | |
| 5,876,662 A | 3/1999 | Jain | |
| 5,891,408 A | 4/1999 | Buisman et al. | |
| 6,030,494 A | 2/2000 | Hupa et al. | |
| 6,080,368 A | 6/2000 | Jackson | |
| 6,174,498 B1 | 1/2001 | Jain et al. | |
| 6,235,248 B1 | 5/2001 | Buisman et al. | |
| 6,248,299 B1 | 6/2001 | Jackson | |
| 6,500,391 B1 | 12/2002 | Jackson | |
| 6,506,347 B1 | 1/2003 | Jackson | |
| 6,558,643 B2 | 5/2003 | Blonigen et al. | |
| 6,638,398 B1 * | 10/2003 | Ramm-Schmidt | C01C 1/10 159/47.3 |
| 6,645,450 B2 | 11/2003 | Stoltz et al. | |
| 6,689,326 B1 | 2/2004 | Jackson | |
| 7,105,039 B2 | 9/2006 | Decker | |
| 7,112,309 B2 | 9/2006 | Stoltz et al. | |
| 7,141,220 B2 | 11/2006 | Jackson | |
| 7,182,919 B2 | 2/2007 | Jackson | |
| 7,258,848 B1 | 8/2007 | Blackwell et al. | |
| 7,270,796 B2 * | 9/2007 | Kemp | B01D 53/58 423/549 |
| 7,416,668 B1 | 8/2008 | Theodore | |
| 7,550,123 B2 | 6/2009 | Temple et al. | |
| 7,553,447 B2 | 6/2009 | Decker et al. | |
| 7,563,372 B1 | 7/2009 | Theodore | |
| 7,632,475 B2 | 12/2009 | Suchak et al. | |
| 7,815,879 B2 | 10/2010 | Temple et al. | |
| 7,867,398 B2 | 1/2011 | Harmon et al. | |
| 7,867,470 B1 | 1/2011 | Marcin | |
| 7,887,615 B2 | 2/2011 | Spindler et al. | |
| RE42,239 E | 3/2011 | Jackson | |
| 7,964,166 B2 | 6/2011 | Suchak | |
| 7,972,408 B2 | 7/2011 | Bruso et al. | |
| 8,007,567 B2 | 8/2011 | Roe et al. | |
| 8,101,070 B2 | 1/2012 | Theodore et al. | |
| 8,182,576 B2 | 5/2012 | Roe et al. | |
| 8,182,593 B2 | 5/2012 | Rapp | |
| 8,206,655 B2 | 6/2012 | Gong et al. | |
| 8,409,512 B2 | 4/2013 | Temple et al. | |
| 8,613,894 B2 * | 12/2013 | Zhao | C05F 5/008 423/168 |
| 8,778,037 B2 | 7/2014 | Shaw et al. | |
| 8,940,258 B2 | 1/2015 | Vera-Castaneda | |
| 8,951,479 B2 | 2/2015 | Jackson et al. | |
| 8,961,915 B1 | 2/2015 | Zhao et al. | |
| 9,005,533 B2 | 4/2015 | Gaiser | |
| 9,095,115 B1 * | 8/2015 | Knueven | A01K 1/0047 |
| 9,265,854 B2 | 2/2016 | Temple et al. | |
| 9,364,787 B2 | 6/2016 | Zhao et al. | |
| 9,364,788 B2 | 6/2016 | Taube | |
| 9,522,206 B2 | 12/2016 | Beaulieu et al. | |
| 9,597,631 B2 | 3/2017 | Taube | |
| 2001/0033816 A1 | 10/2001 | Blonigen et al. | |
| 2001/0037976 A1 | 11/2001 | Blonigen et al. | |
| 2001/0043898 A1 | 11/2001 | Stoltz et al. | |
| 2003/0091478 A1 | 5/2003 | Jackson | |
| 2003/0143127 A1 | 7/2003 | Jackson | |
| 2004/0115112 A1 | 6/2004 | Stoltz et al. | |
| 2004/0237782 A1 | 12/2004 | Decker | |
| 2007/0000386 A1 | 1/2007 | Decker | |
| 2007/0023342 A1 | 2/2007 | Bruso et al. | |
| 2007/0059229 A1 | 3/2007 | Temple et al. | |
| 2007/0062215 A1 | 3/2007 | Spindler et al. | |
| 2008/0044342 A1 | 2/2008 | Muller et al. | |
| 2008/0175777 A1 | 7/2008 | Suchak et al. | |
| 2008/0213126 A1 | 9/2008 | Decker et al. | |
| 2009/0255863 A1 | 10/2009 | Theodore et al. | |
| 2010/0024644 A1 | 2/2010 | Temple et al. | |
| 2010/0037772 A1 | 2/2010 | Roe et al. | |
| 2010/0119427 A1 | 5/2010 | Suchak | |
| 2010/0193429 A1 | 8/2010 | Harmon et al. | |
| 2010/0247705 A1 | 9/2010 | Jackson et al. | |
| 2011/0104012 A1 | 5/2011 | Temple et al. | |
| 2011/0289846 A1 | 12/2011 | Shaw et al. | |
| 2011/0318239 A1 | 12/2011 | Gong et al. | |
| 2012/0000357 A1 | 1/2012 | Roe et al. | |
| 2012/0006746 A1 | 1/2012 | Rapp | |
| 2012/0152853 A1 | 6/2012 | Rapp | |
| 2013/0186823 A1 * | 7/2013 | Hazewinkel | A01C 3/00 210/604 |
| 2013/0202480 A1 | 8/2013 | Temple et al. | |
| 2013/0315807 A1 | 11/2013 | Vera-Castaneda | |
| 2014/0144384 A1 * | 5/2014 | Eutsler | A01K 1/0082 119/161 |
| 2014/0170725 A1 | 6/2014 | Andrews et al. | |
| 2015/0086435 A1 | 3/2015 | Zhao et al. | |
| 2015/0265963 A1 | 9/2015 | Taube | |
| 2015/0359917 A1 | 12/2015 | Beaulieu et al. | |
| 2016/0129392 A1 | 5/2016 | Temple et al. | |
| 2016/0200613 A1 | 7/2016 | Orentlicher et al. | |
| 2016/0250589 A1 | 9/2016 | Zhao et al. | |
| 2016/0256817 A1 | 9/2016 | Taube | |
| 2017/0056821 A1 | 3/2017 | Beaulieu et al. | |

(56) References Cited

U.S. PATENT DOCUMENTS

| | | | |
|---|---|---|---|
| 2017/0128880 A1 | | 5/2017 | Andrews et al. |
| 2017/0291825 A1 * | | 10/2017 | Tao ............... B01D 53/145 |
| 2018/0257028 A1 * | | 9/2018 | Andrews ............ B01D 53/58 |

FOREIGN PATENT DOCUMENTS

| | | | |
|---|---|---|---|
| AT | 315206 B | 5/1974 | |
| AU | 2008200308 A1 | 8/2008 | |
| BE | 655305 A | 3/1965 | |
| BE | 731587 A | 10/1969 | |
| BE | 770769 A1 | 12/1971 | |
| BE | 779901 A1 | 8/1972 | |
| BE | 856658 A1 | 1/1978 | |
| BE | 877742 A1 | 11/1979 | |
| BE | 884358 A1 | 1/1981 | |
| BE | 888237 A1 | 7/1981 | |
| BR | PI9606947 A1 | 12/1997 | |
| BR | 9606947 B1 | 3/2003 | |
| BR | PI0800452 A1 | 4/2008 | |
| BR | PI0800452 A | 9/2008 | |
| BR | 112012011432 A1 | 12/2012 | |
| BR | 112014027446 A1 | 12/2014 | |
| CA | 942662 A | 2/1974 | |
| CA | 960437 A | 1/1975 | |
| CA | 968270 A | 5/1975 | |
| CA | 1106777 A | 8/1981 | |
| CA | 1121658 A | 4/1982 | |
| CA | 1121980 A | 4/1982 | |
| CA | 1124037 A | 5/1982 | |
| CA | 1154934 A | 10/1983 | |
| CA | 2157644 A1 | 3/1996 | |
| CA | 2618778 A1 | 7/2008 | |
| CH | 481018 A | 11/1969 | |
| CH | 622083 A5 | 3/1981 | |
| CN | 1315921 A | 10/2001 | |
| CN | 1141248 C | 3/2004 | |
| CN | 101301567 A | 11/2008 | |
| CN | 202356007 U | 8/2012 | |
| DE | 1467204 A1 | 11/1969 | |
| DE | 1768216 A1 | 10/1971 | |
| DE | 2156455 A1 | 5/1972 | |
| DE | 2136290 A1 | 8/1972 | |
| DE | 2210773 A1 | 10/1972 | |
| DE | 2502117 A1 | 7/1975 | |
| DE | 2502118 A1 | 7/1975 | |
| DE | 2820850 A1 | 11/1978 | |
| DE | 2928693 A1 | 2/1980 | |
| DE | 3027330 A1 | 2/1981 | |
| DE | 19840513 A1 | 4/1999 | |
| DE | 69609050 | 8/2000 | |
| DE | 102005017077 A1 | 10/2006 | |
| DK | 107608 C | 6/1967 | |
| EA | 200100222 A1 | 8/2001 | |
| EP | 0016591 A1 | 10/1980 | |
| EP | 0024551 A2 | 3/1981 | |
| EP | 1151785 A2 | 11/2001 | |
| EP | 1950176 A2 | 7/2008 | |
| EP | 2 628 388 A1 * | 8/2013 | ............... A01K 1/00 |
| EP | 2628388 A1 | 8/2013 | |
| EP | 2923565 A1 | 9/2015 | |
| EP | 2 483 206 B1 * | 3/2017 | ............... B01D 3/10 |
| ES | 306217 A1 | 4/1965 | |
| ES | 400580 A1 | 6/1975 | |
| ES | 482981 A1 | 6/1980 | |
| FI | 43429 B | 12/1970 | |
| FI | 57922 B | 7/1980 | |
| FI | 973234 | 8/1997 | |
| FI | 973617 | 9/1997 | |
| FI | 973234 A | 10/1997 | |
| FI | 973617 A | 3/1999 | |
| FR | 1429548 A | 2/1966 | |
| FR | 2006308 A1 | 12/1969 | |
| FR | 2117103 A5 | 7/1972 | |
| FR | 2127497 A5 | 10/1972 | |
| FR | 2128992 A5 | 10/1972 | |
| FR | 2258214 A1 | 8/1975 | |
| FR | 2258215 A1 | 8/1975 | |
| FR | 2390193 A1 | 12/1978 | |
| FR | 2431660 A1 | 2/1980 | |
| FR | 2461682 A1 | 2/1981 | |
| GB | 1089880 A | 11/1967 | |
| GB | 1267692 A | 3/1972 | |
| GB | 1357426 A | 6/1974 | |
| GB | 1368210 A | 9/1974 | |
| GB | 1374448 A | 11/1974 | |
| GB | 1393415 A | 5/1975 | |
| GB | 1501701 A | 2/1978 | |
| GB | 1501702 A | 2/1978 | |
| GB | 2053180 A | 2/1981 | |
| HK | 1040977 A1 | 12/2004 | |
| IL | 37247 A | 10/1971 | |
| IL | 38868 A | 5/1972 | |
| IL | 37247 B | 5/1974 | |
| IL | 38868 B | 4/1975 | |
| IL | 59381 A | 5/1980 | |
| IL | 59381 B | 4/1984 | |
| IT | 1095265 B | 8/1985 | |
| IT | 1121003 B | 3/1986 | |
| IT | 1131903 B | 6/1986 | |
| JP | S4925560 B2 | 7/1974 | |
| JP | S5169478 A | 6/1976 | |
| JP | S5136719 B2 | 10/1976 | |
| JP | S5232354 B2 | 8/1977 | |
| JP | S53139278 A | 12/1978 | |
| JP | S5556817 A | 4/1980 | |
| JP | S55124527 A | 9/1980 | |
| JP | S5621628 A | 2/1981 | |
| JP | S5659621 A | 5/1981 | |
| JP | S5641562 B2 | 9/1981 | |
| JP | S60118223 A | 6/1985 | |
| JP | S63252530 A | 10/1988 | |
| JP | 2003062051 A | 3/2003 | |
| KR | 20120013733 A | 2/2012 | |
| KR | 101183665 B1 | 9/2012 | |
| LU | 47182 A1 | 12/1964 | |
| NL | 6413977 A | 8/1965 | |
| NL | 6905798 A | 10/1969 | |
| NL | 7113852 A | 8/1972 | |
| NL | 7203008 A | 9/1972 | |
| NL | 7500672 A | 7/1975 | |
| NL | 7500673 A | 7/1975 | |
| NL | 7905525 A | 1/1980 | |
| NL | 163774 C | 10/1980 | |
| NL | 8003958 A | 1/1981 | |
| NL | 165711 C | 5/1981 | |
| NL | 9500215 A | 9/1996 | |
| NO | 116907 B | 6/1969 | |
| NO | 137007 B | 9/1977 | |
| NO | 792367 A | 1/1980 | |
| NO | 973487 | 7/1997 | |
| PL | 2 483 206 T3 * | 9/2017 | ............... B01D 3/10 |
| RU | 2146964 C1 | 3/2000 | |
| SE | 313805 B | 8/1969 | |
| SE | 7906121 L | 1/1980 | |
| SE | 9802979 | 9/1998 | |
| SE | 9802979 L | 3/1999 | |
| SE | 523160 C2 | 3/2004 | |
| TN | 2014000456 A1 | 3/2016 | |
| TW | 323236 B | 12/1997 | |
| WO | 8102891 A | 10/1981 | |
| WO | 9219380 A1 | 11/1992 | |
| WO | 9624434 A1 | 8/1996 | |
| WO | 9827014 A1 | 6/1998 | |
| WO | 9902624 A1 | 1/1999 | |
| WO | 200007935 A1 | 2/2000 | |
| WO | 200166230 A2 | 9/2001 | |
| WO | 200166230 A3 | 1/2002 | |
| WO | 2004011127 A1 | 2/2004 | |
| WO | 2004105974 A2 | 12/2004 | |
| WO | 2005049495 A2 | 6/2005 | |
| WO | 2008016401 A1 | 2/2008 | |
| WO | 2009076104 A1 | 6/2009 | |
| WO | 2010019763 A1 | 2/2010 | |
| WO | 2011060025 A1 | 5/2011 | |

(56) References Cited

FOREIGN PATENT DOCUMENTS

| WO | 2011149880 A1 | 12/2011 |
| WO | 2012031622 A1 | 3/2012 |
| WO | 2013166301 A1 | 11/2013 |
| WO | 2015143111 A1 | 9/2015 |
| WO | 2016012309 A1 | 1/2016 |

* cited by examiner

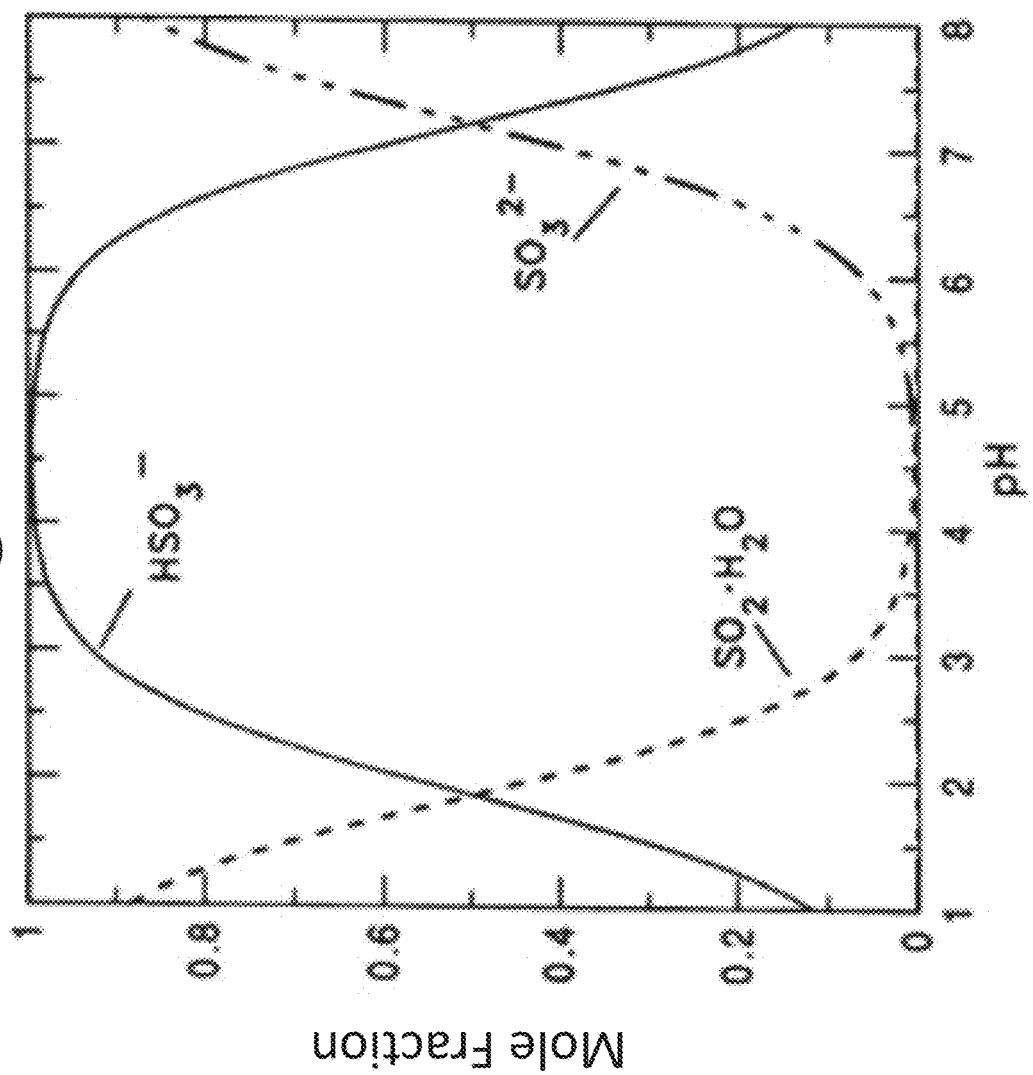

SYSTEMS AND METHODS FOR NITROGEN RECOVERY FROM A GAS STREAM

CROSS-REFERENCE TO RELATED APPLICATIONS

This application claims priority to U.S. Provisional Patent Application No. 62/431,246 titled "Systems and Methods for Nitrogen Recovery from a Gas Stream" filed Dec. 7, 2016, the entire disclosure of which is herein incorporated by reference in its entirety for all purposes.

FIELD OF THE TECHNOLOGY

Aspects and embodiments disclosed herein relate to systems and methods for recovering nitrogen from a gas stream. In particular, systems and methods involve recovering nitrogen from gaseous emissions to produce a fertilizer.

SUMMARY

In accordance with an aspect, there is provided a method of producing treated gas by removing nitrogenous compounds from a gas stream. The method may comprise introducing sulfur dioxide vapor into water to produce aqueous sulfurous acid. In some embodiments, the method may comprise introducing the aqueous sulfurous acid into a gas stream comprising nitrogenous compounds to produce ammonium ions, sulfurous acid ions, a nitrogenous liquid, and treated gas.

In some embodiments, methods disclosed herein may comprise maintaining a pH of the aqueous sulfurous acid and the nitrogenous liquid above 5. For instance, in some embodiments, methods may comprise maintaining a pH of the aqueous sulfurous acid and the nitrogenous liquid between about 5 and about 7. In some embodiments, methods disclosed herein may comprise maintaining a pH of the aqueous sulfurous acid and the nitrogenous liquid between about 2 and about 9.

Methods disclosed herein may further comprise diluting the aqueous sulfurous acid with water.

In accordance with certain embodiments, methods disclosed herein may comprise drying organic material to produce the gas stream comprising nitrogenous compounds. Solids may be separated from the gas stream. For example, solids may be separated from the gas stream and discarded. The organic material may comprise, for example, poultry manure or poultry litter. The organic material may comprise sewage sludge.

In some embodiments, methods disclosed herein may comprise burning elemental sulfur in the presence of oxygen to produce sulfur dioxide vapor.

Methods may comprise maintaining a temperature of the aqueous sulfurous acid and the nitrogenous liquid between about 15° C. and about 80° C.

In some embodiments, the treated gas may comprise less than 1% nitrogen, sulfur, phosphate, and potassium.

In accordance with an aspect, there is provided a method of recovering ammonia from a gas stream. The method may comprise introducing sulfur dioxide vapor into water to produce aqueous sulfurous acid. In some embodiments, the method may comprise introducing the aqueous sulfurous acid into a gas stream comprising nitrogenous compounds to produce ammonium ions, sulfurous acid ions, and a nitrogenous liquid.

In some embodiments, methods disclosed herein may comprise introducing an oxidant to the aqueous sulfurous acid or the nitrogenous liquid to oxidize a predetermined amount of the sulfurous acid ions to sulfate ions. Methods may comprise collecting the nitrogenous liquid comprising remaining sulfurous acid ions, the ammonium ions, and the sulfate ions.

The predetermined amount of the sulfurous acid ions may be between about 5% and about 50% of the sulfurous acid ions.

In accordance with certain embodiments, methods disclosed herein comprise maintaining a concentration of total dissolved solids in the nitrogenous liquid below about 46%. In some embodiments, the nitrogenous liquid comprises at least 8% nitrogen by mass. In some embodiments, the nitrogenous liquid comprises at least 9% sulfur by mass. The nitrogenous liquid may comprise less than 1% phosphate and potassium.

In accordance with certain embodiments, methods disclosed herein comprise maintaining a concentration of total dissolved solids in the nitrogenous liquid above about 46%. Under such conditions, sulfate ions and ammonium ions may precipitate to form ammonium sulfate crystals. The methods may further comprise separating ammonium sulfate crystals from nitrogenous liquid and collecting the nitrogenous liquid. In some embodiments, methods comprise collecting the ammonium sulfate crystals.

In some embodiments, methods may comprise dosing the aqueous sulfurous acid or the nitrogenous liquid with a biological catalyst.

In accordance with yet another aspect, there is provided a system for removing nitrogenous compounds from a gas stream. The system may comprise a source of sulfur dioxide vapor. The system may comprise a source of a gas stream, for example, wherein the gas stream comprises nitrogenous compounds. The system may comprise a source of water. The system may comprise a source of an oxidant. In some embodiments, the system comprises a reaction subsystem fluidly connected to the source of the sulfur dioxide vapor, the source of the gas stream, the source of the water, and the source of the oxidant.

In some embodiments, the source of the sulfur dioxide vapor comprises a sulfur burner.

In some embodiments, the source of the gas stream comprises an organic material dryer. The source of the gas stream may comprise a solids-gas separator comprising a solids waste outlet and a gas stream outlet. The source of the gas stream may be fluidly connected to the reaction subsystem through the gas stream outlet of the solids-gas separator. The reaction subsystem may comprise at least one absorption chamber. The reaction subsystem may comprise a treated gas outlet and a product outlet. In some embodiments, the reaction subsystem may be constructed and arranged to combine the sulfur dioxide vapor, the gas stream, and the water.

The system for removing nitrogenous compounds from a gas stream may comprise a solids-liquid separator. The solids-liquid separator may be fluidly connected downstream of the reaction subsystem through the product outlet. The solids-liquid separator may comprise a solid product outlet and liquid product outlet.

The system for removing nitrogenous compounds may comprise a temperature control subsystem. The temperature control subsystem may be configured to maintain a predetermined temperature range within the reaction subsystem. In some embodiments, the temperature control subsystem comprises a temperature sensor. The temperature control subsystem may comprise a control module electrically connected to the temperature sensor. The control module may be configured to adjust a temperature within the reaction subsystem responsive to a measurement obtained by the temperature sensor. In some embodiments, the temperature control subsystem may comprise a heat exchanger constructed and arranged to transfer heat between the reaction subsystem and one or more of the source of the sulfur dioxide vapor, the source of the gas stream, and the source of the water. The temperature control subsystem may be configured to maintain a predetermined temperature range of between about 15° C. and about 80° C.

The system for removing nitrogenous compounds may comprise an oxidation control subsystem. The oxidation control subsystem may be configured to maintain a predetermined oxidation reduction potential (ORP) within the reaction subsystem. In some embodiments, the system may comprise an ORP sensor configured to measure ORP of a solution within the reaction subsystem. The system may further comprise a control module electrically connected to the ORP sensor. The control module may be configured to adjust the ORP within the reaction subsystem responsive to a measurement obtained by the ORP sensor. In some embodiments, the predetermined ORP may be between about +400 mV and about +900 mV.

The system for removing nitrogenous compounds may comprise a recirculation line. The recirculation line may extend between the at least one absorption chamber and a recycle inlet of the reaction subsystem. In some embodiments, the recirculation line may be constructed and arranged to reintroduce water vapor and residual gases not absorbed in the at least one absorption chamber to the reaction subsystem.

In some embodiments, the system may comprise a pH meter configured to measure pH of a solution within the reaction subsystem. The system may comprise a control module electrically connected to the pH meter. The control module may be configured to adjust pH within the subsystem responsive to a measurement obtained by the pH meter. In some embodiments, the control module is configured to maintain a pH above 5. The control module may be configured to maintain a pH between about 2 and about 9. The control module may be configured to maintain a pH between about 5 and about 7.

In some embodiments, the system may comprise a conductivity meter. The conductivity meter may be configured to measure conductivity of a gas or solution within the reaction subsystem. The system may comprise a control module electrically connected to the conductivity meter. The control module may be configured to adjust the conductivity of the gas or the solution within the reaction subsystem responsive to a measurement obtained by the conductivity meter.

In accordance with certain embodiments, the control module may be configured to maintain a concentration of total dissolved solids in the solution within the reaction subsystem below about 46%.

The control module may be configured to maintain a concentration of total dissolved solids in the solution within the reaction subsystem above about 46%.

The system for removing nitrogenous compounds from a gas stream may comprise a wet electrostatic precipitator positioned within the at least one absorption chamber.

In some embodiments, the system may further comprise an evaporator fluidly connected downstream of the reaction subsystem, for example, through the product outlet. The evaporator may be positioned upstream of the solids-liquid separation unit.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 15 is a graph of mole fraction of various sulfurous compounds as a function of pH.

DETAILED DESCRIPTION

Figure 1:
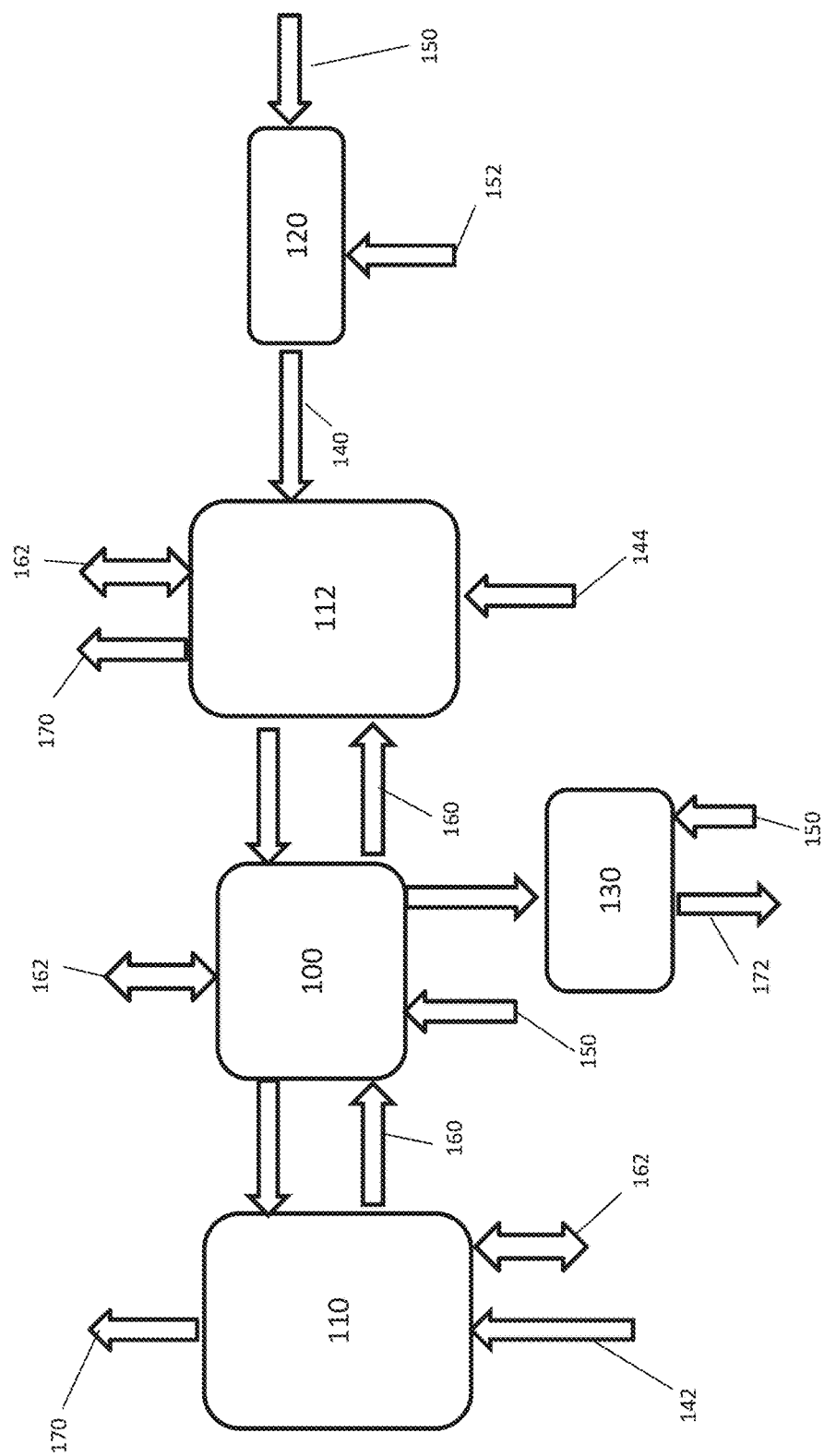
FIG. 1 is a box diagram of a system for removing nitrogenous compounds from a gas stream, according to one embodiment.

Management of the nitrogen cycle has been identified by the National Academy of Engineers of the United States as one of the fourteen Grand Challenges of Engineering in the 21st Century. The nitrogen cycle has been disrupted over the last century by human intervention with the synthesis of reactive nitrogen species for fertilizer production and the combustion of fossil fuels. Nitrogen plays an essential role in the production of food for humanity as it is usually the limiting nutrient for crop productivity. It is hypothesized that the existing or future population of the world could not be sustained without producing ammonia from synthetic fertilizers. The methods currently used to meet worldwide food challenges, however, have led to excess nitrogen in the planetary environment which has generated daunting impacts around the world. Excess nitrogen in the environment may play a role in disruption of ecosystems by the eutrophication of waters like the Gulf of Mexico or Chesapeake Bay, exacerbation of global warming by production of potent greenhouse gases, acidification of lakes and soils, and contribution to the disruption of the ozone layer. Promotion of smog in densely populated areas and contamination of drinking water caused by excess environmental nitrogen may have a direct impact on human health. The combined impacts of nitrogen cycle disruption for the United States are an estimated $210 billion a year.

It is hypothesized that agriculture is responsible of over 50% of all reactive nitrogen inputs to the US. It was recently reported that ammonia deposition surpassed nitrogen oxides as the main atmospheric gas creating the most negative impact on natural ecosystems. Ammonia emissions to the atmosphere can be minimized by proper management of manures and agricultural residues. Recovery of ammonia to produce fertilizers may reduce input to the atmosphere and offset demands for synthetic nitrogen production. It is hypothesized that ammonia emissions during drying of manure or digestate from anaerobic digestion processes account for up to 70% of the total nitrogen in the material. These ammonia emissions generally create a negative environmental impact and waste a valuable resource.

Elemental sulfur may be used as a source of sulfur in agricultural applications. Sulfur dioxide vapor may be produced in a burning process and subsequently dissolved in water to produce dilute sulfurous acid. The dilute sulfurous acid may be used as irrigation water in agriculture in order to provide sulfur to soils with sulfur deficiencies.

Ammonia may be recovered from a gas stream by external addition of acids into a liquid stream contacting the gas and the liquid stream, and ammonia, being a base when dissolved in water, is trapped in the liquid stream. The sulfuric acid may be employed to capture ammonia from the gas for production of ammonium sulfate. Carbonic acid may be employed for production of ammonium bicarbonate. In some applications absorption of ammonia gas in an acid may be conducted using a hydrophobic gas-porous-membrane. Nitric acid may be employed for scrubbing NOx from a gas stream. Generally, nitric acid is generated by oxidizing NOx in water using hydrogen peroxide.

A sulfur burner may be employed to produce sulfurous acid acidifying an aqueous solution, which may be used for capturing ammonia from a gas. Such a process has been previously used in the art. However, it is conventionally required to maintain the pH of the aqueous solution below 5. When having a pH below 5, the aqueous solution may be limited to dilute solutions of ammonia and sulfurous acid ions due to the predominant presence of bisulfite ions formed from the ionization of sulfurous acid in water. Such a solution may be of limited use for ammonia absorption because it limits the dissolution of sulfur dioxide in water as the concentration of the ions increase in the solution. Accordingly, while conventionally practiced, maintaining a pH of aqueous sulfurous acid below 5 limits dissolution of sulfur dioxide in water.

Furthermore, when employing a burner or material dryer, it may be required to control the temperature of the process to below about 80° C. Conventional processes that employ a burner or dryer may produce excessively hot gases that limit the absorption of sulfur in water. Without controlling the temperature of the gases, treated air produced may contain an undesirably high concentration of sulfur due to the reduced absorption of the sulfur dioxide. Furthermore, reduced absorption of sulfur dioxide may limit absorption of ammonia and production of a suitable product.

Another conventional practice in the art is to employ Reverse Osmosis-Electrodialysis for concentrating the dilute solution of ammonia and sulfurous acid ions. The sulfur burning reaction may produce hot sulfur dioxide gases with temperatures reaching 900 to 1500° F., which transfer the heat (about 296,000 J/mol S) to the aqueous solution. Due to the batch nature of conventional systems, the excess heat accumulates in the system creating high liquid solution temperatures that limit the dissolution of both sulfur dioxide gases and ammonia gases, especially at high ionic strength concentrations. Without a mechanism for heat removal, such a system may be limited to gases with cold influent ammonia. Thus, conventional systems are not equipped to remove ammonia from hot gases, such as those coming from manure dryers. Heat from sulfur burners and heat from hot influent gases must be properly managed.

Conventional systems may further not produce ammonium sulfate as a product. To produce sulfate from sulfite or bisulfite, an oxidant, such as but not limited to oxygen, must be employed according to the following reaction:

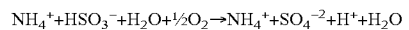

$$NH_4^+ + HSO_3^- + H_2O + \tfrac{1}{2}O_2 \rightarrow NH_4^+ + SO_4^{-2} + H^+ + H_2O$$

where oxygen and bisulfite react to produce sulfate. In this reaction oxygen is presented as an example of oxidant and bisulfite as an example of the ion of sulfurous acid, other oxidants can be used such as hydrogen peroxide. This reaction can be catalyzed by microbes in water or enzymes and its extent controlled by the designer/operator of the system. Where an oxidant is not employed, it is not possible to produce ammonium sulfate. Furthermore, an absence of an oxidant induces the biological reduction of sulfite to produce odorous, corrosive and poisonous hydrogen sulfide in water, a highly undesirable reaction. It is hypothesized that bacteria and archaea naturally present in the solution thrive under anaerobic conditions reducing sulfites to sulfides. The presence of the oxidant may generate conditions inhospitable for such microbes inhibiting sulfide formation and creating an acceptable product.

Accordingly, in accordance with certain embodiments, the invention enables the use of a sulfur burner for recovery of nitrogenous compounds from a gas producing a liquid or a solid fertilizer under conditions not previously possible by conventional methods. The invention may incorporate active management of heat energy for controlling temperature in the process, which in turn may enable or enhance optimization of the reactions taking place. Temperature control by evaporation and condensation of water may be used in accordance to certain embodiments to simultaneously control dissolved solids concentrations beyond what was previously possible, for example, thereby recovering energy and producing a commercial fertilizer from nitrogen emissions that might otherwise contribute to environmental pollution. In certain embodiments, the invention may provide for control of the oxidation reactions of sulfur compounds by adding an oxidant, such as but not limited to oxygen, and creating conditions for chemical or biologically mediated reactions that optimize the process. Controlling oxidation conditions may also provide for a more stable and acceptable product, for example, by inhibiting the formation of odorous and corrosive compounds in the final product. Controlling dissolved solid concentrations and oxidation reactions may provide for operation in ranges of pH that further optimize operational and capital costs of investment.

In accordance with one or more embodiments, the gaseous nitrogenous compounds, including ammonia, can be recovered and converted into usable fertilizers for reuse in the agricultural production of food. The recovery and reuse of nitrogen may reduce ammonia emissions to the environment and contributes to a more sustainable food supply chain.

The following exemplary reactions, some of which may be employed for recovering nitrogen and energy and from gases according to certain embodiments, may serve to illustrate the combination of elemental sulfur (for example, from a solid starting product), oxygen, ammonia gas, and water to produce ammonium salts in solution (for example, as ions of ammonia and ions of multiple sulfur compounds) or ammonium salts that precipitate out in solid form:

$$S(\text{solid}) + O_2(\text{gas}) \rightarrow SO_2(\text{gas}) \quad (1)$$

$$SO_2(\text{gas}) + 2H_2O(\text{liquid}) \rightarrow H_2SO_3(\text{in solution}) + H_2O \quad (2)$$

$$NH_3(\text{gas}) + H_2SO_3(\text{in solution}) + H_2O \rightarrow NH_4^+ + HSO_3^- + H_2O \quad (3)$$

$$NH_4^+ + HSO_3^- + H_2O \rightarrow NH_4^+ + SO_3^{-2} + H^+ + H_2O \quad (4)$$

$$2NH_4^+ + SO_3^{-2} + H_2O \rightarrow (NH_4)2SO_3(\text{solid}) + H_2O \quad (5)$$

$$NH_4^+ + HSO_3^- + H_2O + \tfrac{1}{2}O_2 \rightarrow NH_4^+ + SO_4^{-2} + H^+ + H_2O \quad (6)$$

$$NH_4^+ + SO_3^{-2} + H^+ + H_2O + \tfrac{1}{2}O_2 \rightarrow NH_4^+ + SO_4^{-2} + H^+ + H_2O \quad (7)$$

$$2NH_4^+ + SO_4^{-2} + H_2O \rightarrow (NH_4)2SO_4(\text{solid}) + H_2O \quad (8)$$

Some of the reactions are physical and involve material transfer, while others are chemical in nature, like water ionization. In at least some embodiments, some reactions may be mediated by naturally present microorganisms in the liquid.

As represented in equation (1) elemental sulfur may be burned in the presence of oxygen to produce hot sulfur dioxide vapors. The sulfur dioxide vapors, in turn, may be dissolved in water to produce sulfurous acid, as represented in equation (2). Equation (3) illustrates how ammonia nitrogen in gas form may be readily absorbed in the sulfurous acid solution, forming ammonium ions and bisulfite ions. Bisulfite ions can further ionize to yield sulfite ions in water, as represented in equation (4). The extent of ionization for the formation of each of the two ions, bisulfite and sulfite, will generally depend on the pH of the solution (see, for example, the graph of FIG. 15). In accordance with certain embodiments, controlling the pH of the solution may enable a control of the relative ionic composition of the solution. Sulfite ions usually limit the solubility with ammonia and can precipitate out of solution forming crystals of ammonium sulfite, as represented in equation (5).

Equations (6) and (7) illustrate the oxidation of bisulfite and sulfite ions with oxygen, respectively yielding sulfate ions. Other oxidants can be used instead of oxygen. These oxidation reactions may be catalyzed by naturally occurring organisms which speed up the conversion and allow for a significant reduction in the size of tanks required. The low solubility of oxygen in water limits the extent of the oxidation process, and, therefore, an oxygen source may be required to drive the process to produce sulfate. Sulfate ions and ammonium ions can precipitate out of solution forming crystals of ammonium sulfate, as represented in equation (8). A concentrated solution with ions of ammonium, sulfite, bisulfite and sulfate in different proportions can be the final liquid fertilizer product. The relative proportion of sulfite to bisulfite can be controlled by pH, while the relative proportion of sulfate to sulfite and bisulfite can be controlled with the appropriate dosages of oxidant applied to the process. More oxidant, for example, air, may drive the reaction to more sulfate, while less oxidant may drive the reaction to fewer sulfates. Alternatively, crystals of ammonium sulfite or ammonium sulfate can be separated out of solution as a solid fertilizer product. For example, a 1,000 to 90,000 mg/L concentrated solution of nitrogen may be recovered as a byproduct in accordance with certain embodiments.

In accordance with an aspect, there is provided a method of producing treated gas by removing nitrogenous compounds from a gas stream. The method may result in a reduction of ammonia emissions, for example, those typically produced during anaerobic digestion of organic material, into the environment. In some embodiments, the treated gas may comprise less than 1% of one or more of phosphate, potassium, nitrogen, and sulfur. For example, the treated gas may be substantially free of nitrogen, sulfur, phosphate, and potassium. The treated gas may comprise less than 0.1%, 0.01%, 0.01% or 0.001% nitrogen, sulfur, phosphate, and potassium. In some embodiments, methods disclosed herein may remove at least 80%, at least 85%, at least 90%, at least 95%, at least 99%, at least 99.9%, at least 99.99%, or at least 99.999% of ammonia emissions from the gas stream. The treated gas may conform to environmental standards and be safe for release to the atmosphere. In some embodiments, the treated gas may be post-treated to meet requirements for a specific use.

The method may comprise introducing sulfur dioxide vapor into water to produce aqueous sulfurous acid. The sulfur dioxide vapor may be combined with water according to equation (2) above. Upon contact, the water may absorb and dissolve the sulfur dioxide vapor, thereby producing the aqueous sulfurous acid. The sulfur dioxide vapor may be introduced into water, for example, in a gas-liquid contactor or other chamber.

In some embodiments, methods disclosed herein may comprise burning elemental sulfur in the presence of oxygen to produce sulfur dioxide vapor. The sulfur dioxide vapor may be produced according to equation (1) above. For example, solid sulfur pellets may be heated in a sulfur melting tank to produce sulfur anions. The melted sulfur may be burned in the presence of a gas comprising oxygen, for example, air. In some embodiments, the sulfur dioxide vapor may be produced in, for example, a sulfur burner or other chamber.

In some embodiments, methods and systems disclosed herein may produce an organic product, for example, a certified product suitable for organic farming. Certification may be dependent on the quality of the starting sulfur material. In some embodiments, the sulfur material is compliant with organic certification, and produces a certified organic product. Specifically, such fertilizer products produced by the disclosed methods may not require artificially added sulfur dioxide. Fertilizer products produced by the disclosed methods may comply with requirements outlined by the Organic Materials Review Institute (OMRI).

In some embodiments, the method may comprise introducing the aqueous sulfurous acid into a gas stream comprising nitrogenous compounds to produce ammonium ions, sulfurous acid ions, and a nitrogenous liquid. The sulfurous acid ions may comprise bisulfite and sulfite. In some embodiments, the sulfurous acid ions may comprise sulfate. The ions and nitrogenous liquid may be produced according to equations (3) and (4) above. Specifically, ammonium ions and bisulfite may be produced according to equation (3). Ammonium ions may combine with bisulfite to produce sulfite according to equation (4). The aqueous sulfurous acid may be introduced into the gas stream, for example, in a gas-liquid contactor or other chamber. Upon contact, the aqueous sulfurous acid may absorb the nitrogenous compounds from the gas stream forming the nitrogenous liquid and a treated gas. The treated gas may be released to the environment, collected, or processed for further use.

In accordance with certain embodiments, methods disclosed herein may comprise drying organic material to produce the gas stream comprising nitrogenous compounds. Organic material, for example, moist manure, may be introduced into a dryer. The organic material may be dried, evaporating moisture and ammonia from the manure and producing an ammonia gas stream. The gas stream may be rich in moisture and ammonia. In some embodiments, heat applied during drying may sterilize infectious agents in the organic material. However, non-live contaminants may be released into the gas stream, for example, the gas stream may comprise solid particles such as dust and other volatiles. The contaminants, for example, solids, may be separated from the gas stream. In some embodiments, the contaminants are separated from the gas stream and discarded.

The organic material may comprise, for example, poultry manure or poultry litter. In some embodiments, the poultry manure or poultry litter may comprise chicken manure or chicken litter. Poultry may generally refer to domestic fowl. In some embodiments, poultry may comprise wild game birds. Poultry manure or litter may comprise chicken, turkey, goose, duck, swan, quail, ostrich, or pigeon manure or litter, and combinations thereof. The organic material may comprise animal manure or litter, for example, of any domesticated or farm animal. The organic material may additionally or alternatively comprise sewage sludge. In some embodiments, the organic material may additionally or alternatively comprise food waste, for example, produce waste. Methods disclosed herein may comprise collecting manure, litter, sewage sludge, or food waste. Methods may comprise processing manure, litter, sewage sludge, or food waste to produce an organic material.

In some embodiments a solids separation process may be employed to remove solids from influent gas streams. For instance, dust and other contaminants present in the gases treated and collected may be separated and/or removed from the gas stream. In certain embodiments, no return of solids to the reaction tank would take place.

The sulfur dioxide vapor or gas stream may be produced at a hot temperature. Specifically, when the sulfur dioxide vapor is produced by burning sulfur or when the nitrogenous gas is produced by drying organic material, the vapor or gas may be produced at a hot temperature. Systems and methods disclosed herein may employ temperature control mechanisms. High temperatures generally inhibit the dissolution of gases in liquids. In a recirculating system with relatively limited exchange of liquid, for example, only the product removed from the system (together with a constant supply of heat from, for example, a sulfur burner and a hot input gas stream) may increase the temperature to a point where limited absorption of gases will take place. Any one or more of the following mechanisms may be employed to control temperature. In accordance with certain embodiments, water may be evaporated using the latent heat of vaporization of water and removal of water vapors along the rest of treated gases. In some embodiments, active heat exchange may be employed for removal of heat from hot input gases, for example, sulfur gases (see, for example, FIG. 2 and FIG. 3). In some embodiments, active heat exchange may be employed directly from absorption and/or reaction chambers (see, for example, FIG. 1 and FIG. 12). Active or passive heat exchange may be employed to transfer heat between various components of a system, for example, between a reaction chamber and a sulfur burner or organic material dryer.

Accordingly, methods disclosed herein may comprise maintaining a temperature of the aqueous sulfurous acid and the nitrogenous liquid between about 15° C. and about 80° C. In some embodiments, methods may comprise maintaining a temperature of the aqueous sulfurous acid and the nitrogenous liquid at about 15° C., 20° C., 25° C., 30° C., 35° C., 40° C., 45° C., 50° C., 55° C., 60° C., 65° C., 70° C., 75° C., or 80° C. Such temperatures may enhance the absorption of gases into the liquids.

In some embodiments, methods disclosed herein may comprise maintaining a pH of the aqueous sulfurous acid and the nitrogenous liquid above 5. Maintaining the pH above 5 may avoid or reduce an incidence of sulfate ion formation in the water. In some embodiments, methods may comprise maintaining a pH of the aqueous sulfurous acid and the nitrogenous liquid between about 2 and about 9, between about 5 and about 7, or between about 5 and about 6. In some embodiments, methods disclosed herein may comprise maintaining a pH of the aqueous sulfurous acid and nitrogenous liquid above 2, above 3, above 4, above 5 or above 6. Methods may comprise maintaining a pH of the aqueous sulfurous acid and nitrogenous liquid below 9, below 6, below 7, or below 6.

The pH of the solution used to absorb both gases ammonia and sulfur dioxide can be controlled according to some embodiments. The first mechanism is the oxidation of sulfite and bisulfite which are both weaker acids than sulfate. To increase the pH of the solution, either aeration may be reduced, for example, to reduce acid sulfate formation while ammonia absorption is increased or maintained constant. Additionally, the addition of sulfur dioxide to water may be controlled to further reduce the supply of weak acid bisulfite. Ammonia absorption may be most effective at pH values greater than 5 (see, for example, FIG. 15). At such pH values, sulfite and bisulfite are both present in the solution. The buffering action of the bisulfite-sulfite pair may facilitate ammonia absorption. A mole of ammonia absorbed generally titrates one mole of bisulfite, forming a mole of sulfite ion and resisting the increase in pH which would inhibit ammonia absorption. Sulfite may also enhance sulfur dioxide adsorption by the reverse mechanism. In some embodiments, the method comprises maintaining a pH above 5, 6, 7, 8, or 9. The pH may be selected to correlate with a desired mole fraction of sulfite in solution, as shown in FIG. 15.

Methods disclosed herein may further comprise diluting the aqueous sulfurous acid with water. Aqueous sulfurous acid may be diluted, for example, to compensate for evaporated liquid. Aqueous sulfurous acid may be diluted by adding water or inducing condensation of evaporated liquid. The pH of the solution may be adjusted according to certain embodiments by diluting the aqueous sulfurous acid or nitrogenous liquid. Diluting the aqueous sulfurous acid may serve to alter the temperature of the aqueous sulfurous acid. Diluting the sulfurous acid may also serve to alter a concentration of ions in the sulfurous acid, for example, by reducing a concentration of ions in solution. The lower concentration of ions in solution may enhance sulfur dioxide and/or nitrogenous compound absorption in the solution. The lower concentration of ions in solution may further prevent precipitation of ions.

In some embodiments, conductivity of one or more process liquids may be measured. Upon reaching a threshold conductivity, one or more of the process liquids may be diluted to maintain the conductivity within a working range. The value of the threshold conductivity may generally vary with certain parameters. For example, the threshold conductivity may be a factor of the quality of the sulfur dioxide vapor, gas stream, or water. In some embodiments, the threshold conductivity may be a factor of the quality of the elemental sulfur, burning process, organic material, or the drying process. The threshold conductivity may be between about 200 µS and about 2000 µS, between about 2000 µS and about 20000 µS, between about 20 thousand µS and about 200 thousand µS, or between about 200 thousand µS and about 1.2 million µS.

In some embodiments, methods and systems disclosed herein may produce a fertilizer product comprising at least 8% nitrogen and at least 9% sulfur. The sulfur content may be in a form suitable for immediate release and consumption by vegetation. Specifically, the sulfur product may comprise sulfur in the form of sulfurous acid ions, sulfate, and ammonium sulfate. Fertilizer products produced by conventional methods may contain sulfur in the form of sulfate and ammonium sulfate. Specifically, conventionally produced fertilizer products which do not control oxidation of sulfurous acid ions may not comprise a suitable concentration of sulfurous acid ions for immediate release application. Release of sulfur nutrients from sulfate and ammonium sulfate may be extended, resulting in a delayed release to vegetation.

In accordance with another aspect, there is provided a method of recovering ammonia from a gas stream. Ammonia may be recovered from a gas stream, for example, to produce fertilizer. The fertilizer may be liquid fertilizer comprising nitrogenous compounds. In some embodiments the fertilizer may be a solid fertilizer comprising ammonium sulfate crystals. Methods of recovering ammonia from a gas stream and methods of producing a fertilizer may comprise introducing sulfur dioxide vapor into water and introducing an aqueous sulfurous acid into a gas stream comprising nitrogenous compounds. In embodiments wherein the gas stream is produced from organic material, fertilizer produced by such methods as described herein may be organic fertilizer, for example, for use on organic farms.

In some embodiments, methods disclosed herein may comprise introducing an oxidant to the aqueous sulfurous acid or to the nitrogenous liquid to produce sulfate ions. The oxidant may be introduced to oxidize a predetermined amount of the sulfurous acid ions to sulfate ions. The oxidant may comprise oxygen, hydrogen peroxide, or a halogen. In some embodiments, introducing an oxidant comprises contacting the aqueous sulfurous acid or nitrogenous liquid with air. Sulfite or bisulfite ions may partially oxidize to produce sulfate ions according to equations (6) and (7) above. Oxidation to sulfate will generally lower the pH of the solution by exchanging a weak acid for a strong acid. As disclosed herein, oxidation may comprise partial oxidation and need not be a complete conversion of ionic species. Oxidation may be controlled by the amount of oxidant supplied to the liquid solution. In some embodiments, an oxidant is introduced in a controlled amount to achieve a desired conversion. For example, oxidation may be controlled to oxidize between about 5%-50% of the sulfurous acid ions, for example, by controlling supply of the oxidant to the liquid solution. Oxidation may be controlled to between about 5%-40%, 5%-30%, 5%-20%, 5%-15%, 5%-10%, 10%-15%, 10%-20%, 10% - 30%, 10%-40%, or 10%-50%. Oxidation may be controlled to less than 5%, less than 10%, less than 15%, less than 20%, or less than 25% conversion. In some embodiments, a fraction of the aqueous sulfurous acid or nitrogenous liquid is oxidized.

Ammonium ions may combine with sulfite or sulfate in solution to precipitate into ammonium sulfite or ammonium sulfate crystals according to equations (5) and (8), respectively. In particular, oxidized ions may combine to form ammonium sulfate while non-oxidized ions may combine to form ammonium sulfite. In some embodiments, oxidized ions may produce ammonium bisulfate. Thus, controlling the amount of oxidation may control a relative concentration of ammonium sulfite, ammonium sulfate, and ammonium bisulfate in a solid precipitate. Generally, it may be a challenge to produce 100% ammonium sulfite because trace amounts of oxidant may seep into the liquid solutions, producing sulfate.

The concentration of the final ions in solution may be controlled by employing dilution of process liquids with water. In some embodiments, process liquids may be diluted or evaporated to induce formation of crystals of ammonium sulfate or ammonium sulfite. In some embodiments, methods disclosed herein comprise maintaining a concentration of total dissolved solids (TDS) in the nitrogenous liquid below about 46%. The concentration may be maintained below 46% to avoid the formation of crystals. The concentration of TDS may be maintained below about 35%, 40%, 41%, 42%, 43%, 44%, 45%, or 46%.

In accordance with certain embodiments, methods disclosed herein comprise maintaining a concentration of TDS in the nitrogenous liquid above about 46%. The concentration of TDS may be maintained above about 46% to induce formation of crystals. Methods may comprise maintaining a concentration of TDS above about 46%, 47%, 48%, 49%, 50%, or 55%. The crystals may comprise solid ammonium sulfate. The methods may further comprise separating the nitrogenous liquid from the crystals to form two fractions, a liquid fraction and a solids containing fraction. The solids containing fraction may comprise the ammonium sulfate crystals. In some embodiments, the method comprises collecting the nitrogenous liquid, the crystals, or both. The crystals may further be processed as a final product. For example, the crystals may be processed as a solid fertilizer.

The crystals may comprise at least 21% nitrogen by mass and at least 24% sulfur by mass. In some embodiments, the solid product may comprise at least 22% nitrogen by mass and at least 25% sulfur by mass. The solid product may comprise at least 15%, 16%, 17%, 18%, 19%, 20%, 21%, 22%, 23%, 24%, or 25% nitrogen by mass. The solid product may further comprise at least 20%, 21%, 22%, 23%, 24%, 25%, 26%, 27%, 28%, 29%, or 30% sulfur by mass. In some embodiments, the solid product may comprise less than 1% phosphate and potassium. The solid product may be substantially free of phosphate and potassium. For example, the solid product may comprise less than 0.1%, 0.01%, 0.01% or 0.001% phosphate and potassium.

The nitrogenous liquid may further be processed as a final product. For example, the nitrogenous liquid may be processed as a liquid fertilizer. In some embodiments, the nitrogenous liquid comprises at least 8% nitrogen by mass. The nitrogenous liquid may comprise at least 4%, 5%, 6%, 7%, 8%, 9%, or 10% nitrogen by mass. In some embodiments, the nitrogenous liquid comprises at least 9% sulfur by mass. The nitrogenous liquid may comprise at least 4%, 5%, 6%, 7%, 8%, 9%, 10%, 11%, or 12% sulfur by mass. The quality of the nitrogenous liquid (nitrogen and sulfur concentration) may be controlled by controlling the temperature, for example, to increase absorption of sulfur dioxide in water. The quality of the nitrogenous liquid may further be controlled by maintaining a pH higher than 5, for example, to increase a concentration of sulfite in the solution. Furthermore the quality of the nitrogenous liquid may be controlled by controlling addition of an oxidant (ORP of the solution), for example, to maintain a concentration of sulfite and bisulfite ions in the solution. In some embodiments, the nitrogenous liquid may comprise less than 1% phosphate and potassium. The nitrogenous liquid may be substantially free of phosphate and potassium. For example, the nitrogenous liquid may comprise less than 0.1%, 0.01%, 0.01% or 0.001% phosphate and potassium.

Figure 4:
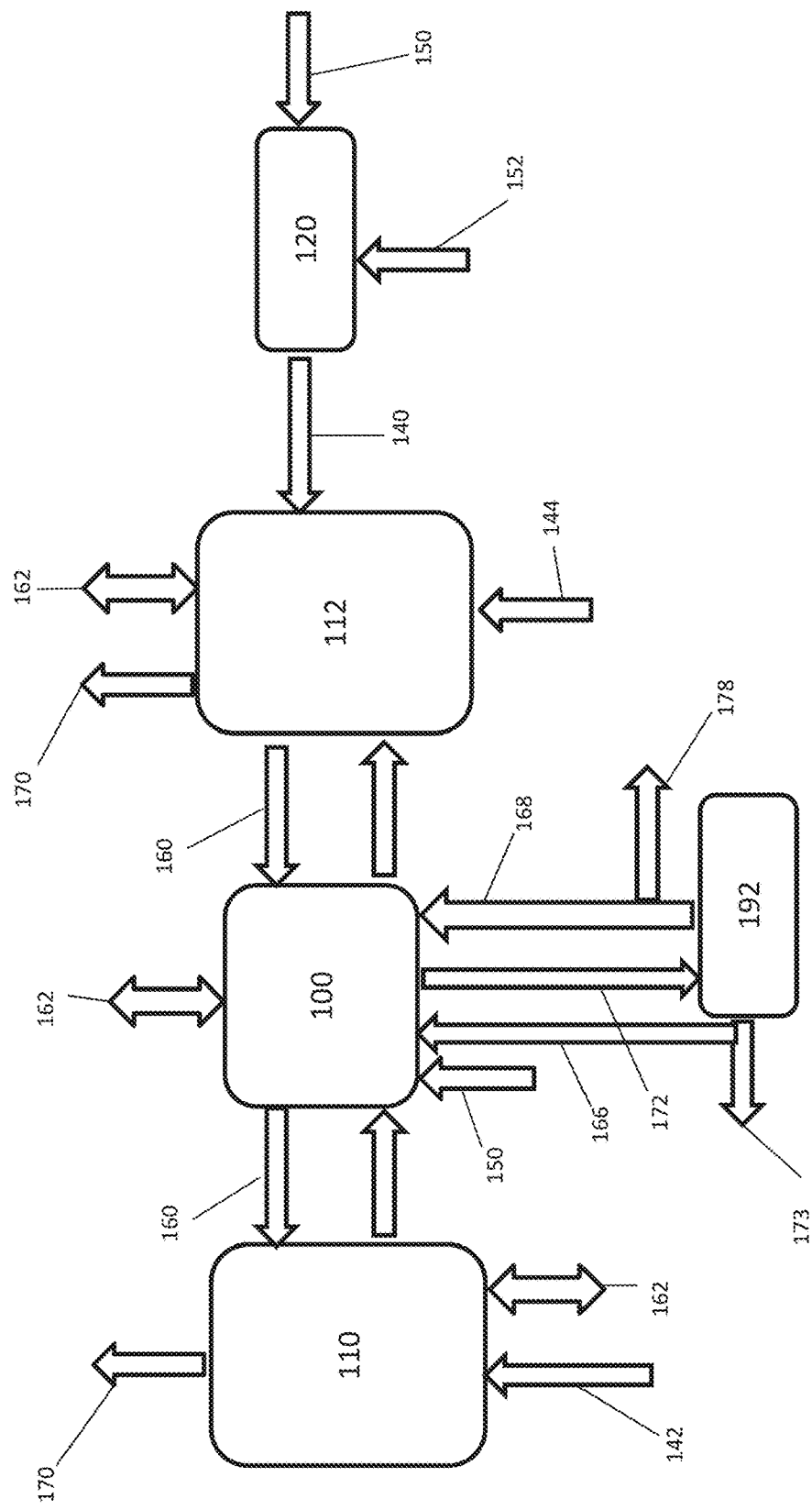
FIG. 4 is a box diagram of an alternate embodiment of a system for removing nitrogenous compounds.
Figure 11:
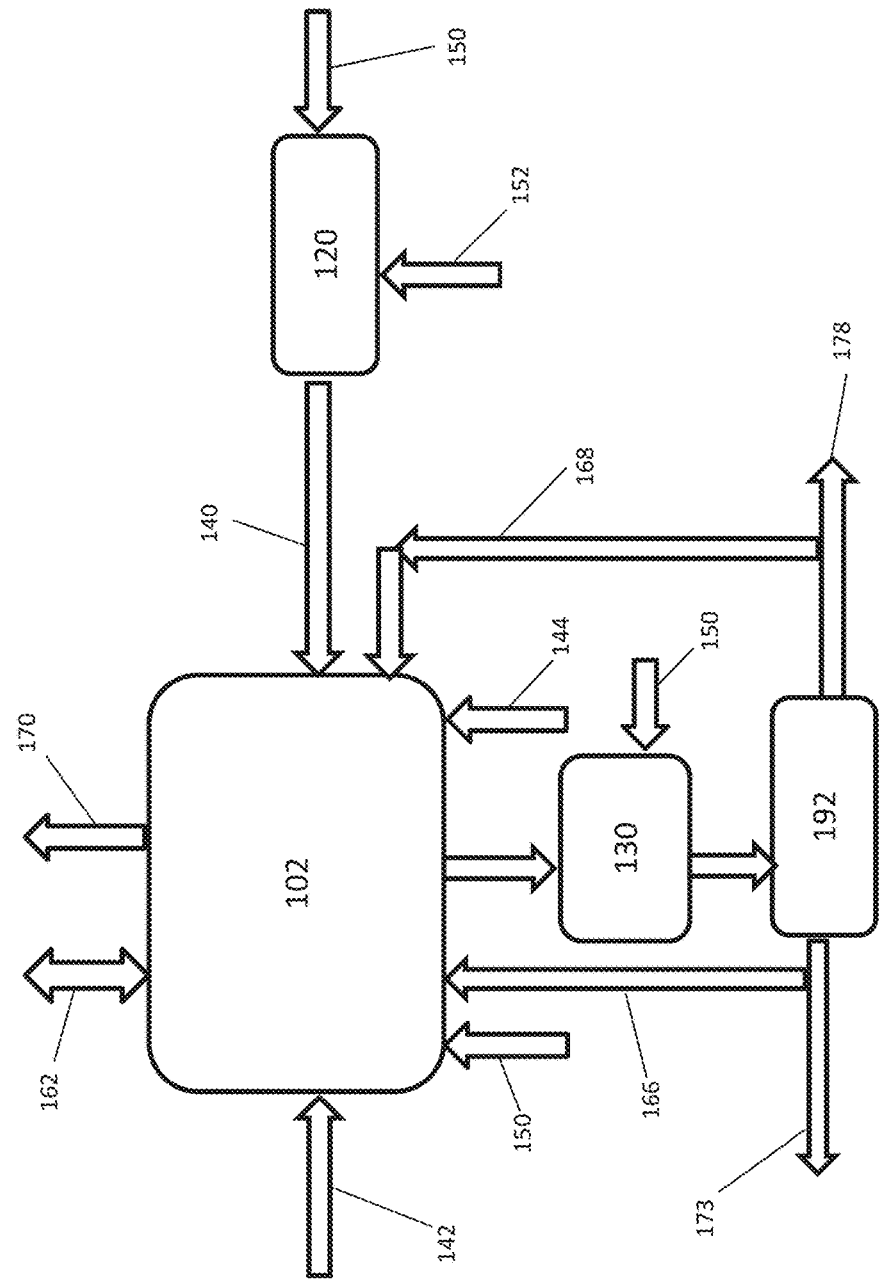
FIG. 11 is a box diagram of an alternate embodiment of a system for removing nitrogenous compounds.

In some embodiments, methods may comprise dosing the aqueous sulfurous acid or the nitrogenous liquid with a biological catalyst. In accordance with certain embodiments, a naturally occurring microbial culture may be employed to enhance the oxidation of sulfite and bisulfite to sulfate ions. Process liquids may be dosed with biological catalyst, for example a microbial or enzymatic organism. Catalysis may be accomplished by retaining the biological organisms catalyzing the oxidation in the reaction tank where oxygen is supplied. Once the organisms grow and are established in the system, they may be separated out of the final liquid and/or solid product. In accordance with certain embodiments, the separated biological organisms may be returned back to the reaction tank to enhance the culture, further speeding the oxidation reaction. FIG. 4 and FIG. 11 illustrate exemplary system embodiments where biological catalysts may be employed.

In accordance with yet another aspect, there is provided a system for removing nitrogenous compounds from a gas stream. The system may comprise a source of sulfur dioxide vapor, a source of a gas stream (for example, a gas stream comprising nitrogenous compounds), a source of water, and a source of an oxidant. The system may further comprise a reaction subsystem comprising at least one absorption chamber. The system may comprise a solids-liquid separator, a temperature control subsystem, an oxidation control subsystem, and a recirculation line.

The system for removing nitrogenous compounds from a gas stream may comprise a source of sulfur dioxide vapor. In some embodiments, the source of the sulfur dioxide vapor comprises a sulfur burner. The sulfur burner may be configured to burn sulfur to produce the sulfur dioxide vapor. The sulfur burner may have an inlet for oxygen, for example, air. In some embodiments, the source of the sulfur dioxide vapor may further comprise a sulfur melting tank. The sulfur melting tank may be employed to melt sulfur pellets, for example, in preparation for the sulfur burner. Thus, the sulfur melting tank may be positioned upstream from the sulfur burner.

In some embodiments, the system may comprise a source of a gas stream, for example, wherein the gas stream comprises nitrogenous compounds. The source of the gas stream may provide a process gas from organic material. For instance, the source of the gas stream may comprise an organic material dryer. The organic material dryer may be configured to receive liquid organic material, for example manure, and evaporate moisture and/or ammonia from the organic material, producing a gas stream.

The system may further comprise a solids-gas separator comprising a solids waste outlet and a gas outlet. The solids-gas separator may comprise, for example, an air filter or a multicyclone separator. The solids-gas separator may be configured to remove dust and other contaminants from one or more gas streams within the system. In some embodiments, the solids-gas separator may be positioned downstream from the source of the sulfur dioxide or from the source of the gas stream. For example, the source of the sulfur dioxide or the source of the gas stream may be fluidly connected to the reaction subsystem through the gas outlet of a solids-gas separator. In some embodiments, the system comprises a solids-gas separator downstream from the reaction subsystem, configured to remove contaminants from the treated air. Any waste collected through the solids waste outlet of the separator may be discarded.

The system may comprise a source of water. The source of water may be fluidly connected to the reaction subsystem. In some embodiments, the source of water comprises one or more pre-treatment units configured to remove contaminants from the water.

The system may comprise a source of an oxidant. The source of the oxidant may be configured to provide an oxidant to the reaction subsystem. The source of the oxidant may be a source of air, oxygen, hydrogen peroxide, or a halogen, for example, a gas tank or an air blower. In some embodiments, the source of the oxidant comprises an aeration vent.

In some embodiments, the system comprises a reaction subsystem fluidly connected to the source of the sulfur dioxide vapor, the source of the gas stream, the source of the water, and the source of the oxidant. The reaction subsystem may be constructed and arranged to combine the sulfur dioxide vapor, the gas stream, the water, and the oxidant. The reaction subsystem may comprise at least one absorption chamber, wherein one or more of the gases and liquids are combined within the absorption chamber. In some embodiments, the absorption chamber may comprise a gas-liquid contactor. The gas-liquid contactor may introduce a gas into a liquid (for example, sulfur dioxide vapor, the gas stream, or the oxidant) by dispersing the gas with a fine mist of solution or by flowing the gas though a volume of solution. The gas-liquid contactor may be a differential gas-liquid contactor or a stagewise gas-liquid contactor. The absorption chamber may comprise one or more of a gas sparger, a gas-liquid column (for example, a falling-film column, a packed column, a bubble column, or a plate column), a spray tower, an agitated vessel, a scrubber, a rotating disc contactor, a Venturi tube, a dispersion tube, or any other vessel configured to contact a gas and a liquid. The reaction subsystem may comprise at least one of a treated gas outlet and a product outlet. The reaction subsystem may further comprise at least one of a gas inlet and a liquid inlet.

In some embodiments the reaction of the sulfur dioxide vapors with water and the reaction of the nitrogenous gases with aqueous sulfurous acid take place in one chamber, while in other embodiments the reactions take place in separate chambers. The separate chambers may comprise one or more lines between them, configured to transport one or more gas, liquid, or solution from one chamber to another. The one or separate chambers may comprise one or more recirculation lines.

The system for removing nitrogenous compounds from a gas stream may comprise a solids-liquid separator. The solids-liquid separator may be fluidly connected downstream of the reaction subsystem through the product outlet. The solids-liquid separator may be configured to separate the reaction subsystem product into a liquid product and a product comprising solids. In some embodiments, the solids-liquid separator employs filtration (for example by size, charge, or density) to separate a liquid fraction from solids. In some embodiments, the solids-liquid separator employs sedimentation (for example, comprising a clarifier or thickener) to separate a liquid fraction from solids. The liquid product may comprise nitrogenous liquid fertilizer. The product comprising solids may comprise ammonium sulfite, ammonium bisulfite, or ammonium sulfate crystals. The solids-liquid separator may comprise a solid product outlet and liquid product outlet. Each of the products may be further processed for use, for example, as a fertilizer.

The system for removing nitrogenous compounds may comprise a temperature control subsystem. The temperature control subsystem may be configured to maintain a predetermined temperature range within the reaction subsystem. The temperature control subsystem may employ active or passive heat transfer. In some embodiments, the temperature control subsystem comprises a chiller or a heater. The temperature control subsystem may further be configured to provide heat to the source of the sulfur dioxide or the source of the gas stream, for example, to burn sulfur or dry organic material. The temperature control subsystem may comprise a heat exchanger constructed and arranged to transfer heat between the reaction subsystem and one or more of the source of the sulfur dioxide vapor, the source of the gas stream, and the source of the water. The heat exchanger may employ mechanisms to diffuse heat within the system, for example, to conserve heat energy.

In some embodiments, the temperature control subsystem comprises a temperature sensor. One or more setting may be adjusted manually or automatically upon measuring a temperature outside the predetermined temperature range. The temperature control subsystem may comprise a control module electrically connected to the temperature sensor. In some embodiments, the control module may be configured to adjust a temperature within the reaction subsystem, for example, manually or automatically, responsive to a measurement obtained by the temperature sensor. The temperature control subsystem may be configured to maintain a predetermined temperature range, as previously disclosed herein. In some embodiments, the predetermined temperature range is between about 15° C. and about 80° C.

The system for removing nitrogenous compounds may comprise an oxidation control subsystem. The oxidation control subsystem may be configured to maintain a predetermined oxidation reduction potential (ORP) within the reaction subsystem. In some embodiments, the oxidation control system may comprise ORP sensor configured to measure ORP of a solution within the reaction subsystem. One or more setting may be adjusted manually or automatically upon measuring an ORP that requires adjustment. The system may further comprise a control module electrically connected to the ORP sensor. The control module may be configured to adjust the ORP within the reaction subsystem, for example, manually or automatically, responsive to a measurement obtained by the ORP sensor. The control module may be configured to provide more or less oxidant to the reaction subsystem, to adjust the ORP therein.

In some embodiments, the predetermined ORP is between about +400 mV and about +900 mV. The predetermined ORP may be between about +200 mV and about +1200 mV, between about +400 mV and about +1000 mV, between about +500 mV and about +700 mV, between about +400 mV and about +600 mV, between about +500 mV and about +800 mV, or between about +600 mV and about +900 mV. The predetermined ORP may be about +400 mV, about +500 mV, about +600 mV, about +700mV, about +800 mV, or about +900 mV. The predetermined ORP may be less than about +900 mV, less than about +800 mV, less than about +700 mV, less than about +600 mV, less than about +500 mV or less than about 400 mV. In some embodiments, the predetermined ORP may be more than about +400 mV, more than about +500 mV, more than about +600 mV, more than about +700 mV, more than about +800 mV, or more than about +900 mV.

The system for removing nitrogenous compounds may comprise a recirculation line. The recirculation line may be constructed and arranged to reintroduce water vapor and residual gases not absorbed in the at least one absorption chamber to other components of the system. For example, the recirculation line may reintroduce water vapor and residual gases into the reaction subsystem. In some embodiments, the recirculation line may extend between the at least one absorption chamber and a recycle inlet of the reaction subsystem. The recirculation line may extend between separate absorption chambers of the reaction subsystem or between the solids- liquid separator and the reaction subsystem. The system for removing nitrogenous compounds may comprise more than one recirculation line, for example, a network of recirculation lines, extending between different components of the system.

In some embodiments, the system may comprise a pH meter configured to measure pH of a solution within the reaction subsystem. One or more setting may be adjusted manually or automatically upon measuring a pH that requires an adjustment. The system may comprise a control module electrically connected to the pH meter. The control module may be configured to adjust pH within the subsystem, for example, manually or automatically, responsive to a measurement obtained by the pH meter. The pH may be adjusted as required by addition of an acid or a base, by adjusting a concentration of oxidant within the system (for example, increasing or decreasing aeration), by increasing a concentration of sulfur dioxide vapor within the reaction subsystem, or by dilution or evaporating a solution within the system. The control module may be configured to adjust pH to a value as previously described herein. For example, in some embodiments, the control module may be configured to maintain a pH above 5, maintain a pH between about 2 and about 9, or maintain a pH between about 5 and about 7. In some embodiments, a pH may be maintained between 5-6, 5-7, 5-8, 5-9, 6-7, 6-8, 6-9, 7-8, 7-9, or 8-9. The control module may be configured to maintain a pH correlated to a desired mole fraction of sulfite and bisulfite in solution, as shown in FIG. 15. In some embodiments, the pH may be selected such that solution contains at least a 0.05 mole fraction of sulfite. The pH may be selected such that solution contains at least a 0.05, 0.06, 0.07, 0.08, 0.09, 0.1, 0.2, 0.3, 0.4, 0.5, 0.6, 0.7, 0.8, 0.9, 1.0, 1.2, 1.4, 1.6, 1.8, or 2.0 mole fraction of sulfite.

In some embodiments, the system may comprise a conductivity meter. The conductivity meter may be configured to measure conductivity of a gas or solution within the reaction subsystem. One or more setting may be adjusted manually or automatically upon measuring a conductivity that requires adjustment. The system may comprise a control module electrically connected to the conductivity meter. The control module may be configured to adjust the conductivity of the gas or the solution within the reaction subsystem, for example manually or automatically, responsive to a measurement obtained by the conductivity meter. In some embodiments, the control module may adjust conductivity by adjusting one or more of pH, temperature, concentration of ions, or concentration of an oxidant in the reaction subsystem.

In accordance with certain embodiments, the control module may be configured to maintain a predetermined concentration of TDS in the solution within the reaction subsystem. For instance, the control module may be configured to maintain a concentration of TDS below about 46%. The control module may be configured to maintain a concentration of TDS in the solution within the reaction subsystem above about 46%. In some embodiments, the control module may adjust a concentration of TDS within the reaction subsystem by adjusting one or more of pH, temperature, concentration of ions, or concentration of an oxidant in the reaction subsystem.

The system for removing nitrogenous compounds from a gas stream may comprise a wet electrostatic precipitator positioned within the at least one absorption chamber. The wet electrostatic precipitator may be employed to prevent precipitation and/or aerosolization of product gas within the absorption chamber. The prevention of precipitation and/or aerosolization may limit and/or control unwanted byproducts from exiting the system. In some embodiments, the wet electrostatic precipitator may improve a yield of ammonia in the product by controlling undesired precipitation and/or aerosolization of the product.

In some embodiments, the system may further comprise an evaporator fluidly connected downstream of the reaction subsystem, for example, through the product outlet. The evaporator may be configured to evaporate excess moisture from a liquid product. The evaporator may produce product vapor and a concentrated liquid product. In some embodiments, the evaporator may be positioned upstream of the solids-liquid separation unit. The evaporator may deliver the concentrated liquid product to the solids-liquid separation unit to be further processed.

In accordance with certain embodiments, evaporation and condensation of water may be controlled, which may have an impact on the concentration of dissolved ions in solution. A net evaporation system can be designed and operated where heat is removed from the system as latent heat in the water vapor is removed with the treated gases. In such embodiments, make up water may be added periodically or as-needed to control the concentration of ions in solution and make up for any additional losses in the liquid product. Evaporation and condensation may generally take place in an absorption chamber (see, for example, FIG. 1 to FIG. 12) simultaneously with the gas absorption.

A net condensing system may be designed and operated in accordance with certain embodiments. Heat may be removed from the system using heat exchangers to extract heat from the absorption chamber, for example, as presented in FIG. 1 to FIG. 12. Water may be condensed from the influent gases containing ammonia, further adding heat. In some embodiments, the amount of condensed water is in excess of the water needed for the product. In such embodiments, no make-up water may be necessary. Additionally, the final concentration ions in the liquid product might be too low, potentially necessitating an additional evaporation step to concentrate the product solution (see, for example, FIGS. 3, 5, 9, 10, and 12). In such embodiments, the evaporator may be run to induce crystallization of ammonium sulfate or ammonium sulfite, which can be removed from solution in a solid liquid separation step.

The system for removing nitrogenous compounds may comprise a plurality of channels extending between separate components of the system for delivering gases and solutions between the components of the system. The system may comprise one or more pumps, blowers, or fans to drive gases and solutions within the system. The system may further comprise one or more tanks for holding gases or solutions, for example, product tanks for holding liquid product and/or product comprising solids.

A box drawing of an exemplary system for the removal and/or recovery of nitrogenous compounds in accordance with one or more embodiments is presented in FIG. 1. Gas containing nitrogenous compounds is introduced into a first absorption chamber and put in contact with a liquid containing sulfur ions. In one embodiment, the absorption chamber may be a spray tower as presented in FIG. 6. The pH of the aqueous sulfurous acid in the reaction subsystem may be controlled as previously described, for example, to a pH higher than 5 and less than 7, to take advantage of the buffering action of the pair of sulfite-bisulfite ions, as previously described.

The aqueous sulfurous acid may be produced by the combustion of elemental sulfur and subsequent absorption into a liquid stream in a sulfur burner. The acidity resulting from the presence of sulfur-containing ions may be neutralized by the nitrogenous compounds as presented in equations (3), (4), (6) and (7) above. Water vapor may either be condensed into or removed from the liquid depending on the operation of the unit for temperature and control of TDS. Ammonia may be absorbed into the liquid stream and treated gas may be released from the first absorption chamber. Heat might be added to or removed from the first absorption chamber in order to control the temperature of the liquid. A recirculation line from a reaction subsystem may provide fresh pH-controlled solution and remove nitrogenous solution from the first absorption chamber.

Sulfur may be combusted in a sulfur burner using oxygen from the air or an enriched oxygen gas to generate a stream of hot burner gas rich in sulfur dioxide vapor. In some embodiments, such as in FIG. 2 and FIG. 3, some of the heat from the hot burner gas is transferred to a second fluid and recovered for reuse if needed. The vapor may be conveyed to a second absorption chamber, where the sulfur dioxide may be absorbed into a liquid to form dilute sulfurous acid according to equations (1) and (2) above. Some oxidation to sulfuric acid might happen when oxygen is present.

The temperature of the hot gases may be reduced by water evaporation. Make up water may be added to maintain the concentration balance of the solution. The total dissolved solids concentration can be controlled to less than 46% in order to avoid crystallization of ammonium salts, or maintained above 46% to induce crystallization of ammonium salts. In one embodiment the second absorption chamber may be a spray tower, as presented in FIG. 5, but other gas liquid absorption devices can be used.

The liquid containing sulfurous acid may be conveyed from the second absorption chamber to the reaction subsystem, while liquid from the reaction subsystem with neutralized sulfurous acid may be returned to the second absorption chamber via a second recirculation line. In the reaction subsystem an oxidant, such as air or hydrogen peroxide, may be introduced. The oxidant may convert sulfite and bisulfite ions, formed by the reaction of sulfurous acid with ammonia to sulfate according to equations (3), (4), (6) and (7). In some embodiments the circulating liquid may also contain a microbial culture that enhances the rate of oxidation of sulfite and bisulfite to sulfate using oxygen, nitrates, iron, or manganese compounds as oxidants. The ratio of sulfite and bisulfite to sulfate may be controlled by adjusting a concentration of oxidant in the liquid.

Heat may be added or removed from the reaction subsystem, for example, for the purpose of controlling the temperature of the process. The treated and cooled burner gas after removal of the majority of the sulfur dioxide may be conveyed out of the second absorption chamber. Any water vapor formed during the evaporation of the liquid may be removed with the remaining gas. A liquid effluent stream with the neutralized ammonium ions and sulfite bisulfite and/or sulfate ions may be withdrawn from the reaction subsystem as the fertilizer product. The liquid effluent stream may be conveyed to an optional oxidation chamber to convert any remaining sulfite and bisulfite ions into sulfate by reaction with an oxidant, such as but not limited to oxygen from the air, producing a sulfate rich liquid effluent.

The gas stream containing the nitrogenous compounds may be conveyed to a particle removal process for treatment to remove dust particles entrained in the gas. In one embodiment, the particle removal process comprises a wet scrubber where a liquid solution may be put in contact with the gas to capture the dust particles. Heat may be added to maintain the temperature of the vapors in the range of between about 20° C. to about 150° C. and minimize condensation of vapors. In some embodiments, when the gas containing the nitrogenous compounds is hot, water evaporation may be used to cool down the gases.

FIG. 1 presents one embodiment of the invention where hot sulfur dioxide gases 140 from the sulfur burner 120 are conveyed to an absorption chamber 112. Water 144 may be used to cool the gases by evaporation until a temperature is reached where sulfur dioxide can be effectively absorbed, forming sulfurous acid and ions in solution. Make up water 144 may be added as needed to replace the water evaporated and the water removed from the system as liquid effluent 172. Water vapor and residual gases not absorbed 166 (shown in FIG. 4) may be collected and reintroduced into the system for further absorption. Liquid from the absorption chamber 160 may be actively exchanged back and forth with another absorption chamber 110 or reaction chamber 100.

In the absorption chamber 112, an oxidant 150 may be introduced to promote the oxidation of sulfite and bisulfite ions to sulfate. Heat 162 may be removed from or added to the system using a heat exchanger 180 (shown in FIG. 2) or by evaporating or condensing water in the system to control temperature. The extent of the oxidation of sulfite and bisulfite ions to sulfate may be carefully controlled in the reaction subsystem to obtain conditions that favor the absorption of ammonia and sulfur dioxide in water. The reaction subsystem may have active exchange of liquid back and forth between chambers. Liquid from the reaction subsystem may be put in contact with the gases containing nitrogenous compounds 142, absorbing them into solution. The treated gases 170 may be discharged.

The temperature in the first absorption chamber 112 may be controlled by adding or removing heat 162 to the liquid using a heat exchanger 180 or by inducing evaporation or condensation of water from or into the system. The pH of the absorbing solution may be controlled in the reaction subsystem to a pH level optimal for absorbing ammonia and sulfur dioxide gases. The concentration of ions in the liquid solution may be controlled by removing some liquid from the reaction subsystem and adding additional make up water 144 or by inducing condensation of water from the influent gases. The liquid effluent 172 removed from the reaction subsystem may be optionally conveyed to an oxidation chamber 130 where any unreacted sulfite and bisulfite ions may be converted to sulfate ions using air or any suitable oxidant 150.

Figure 2:
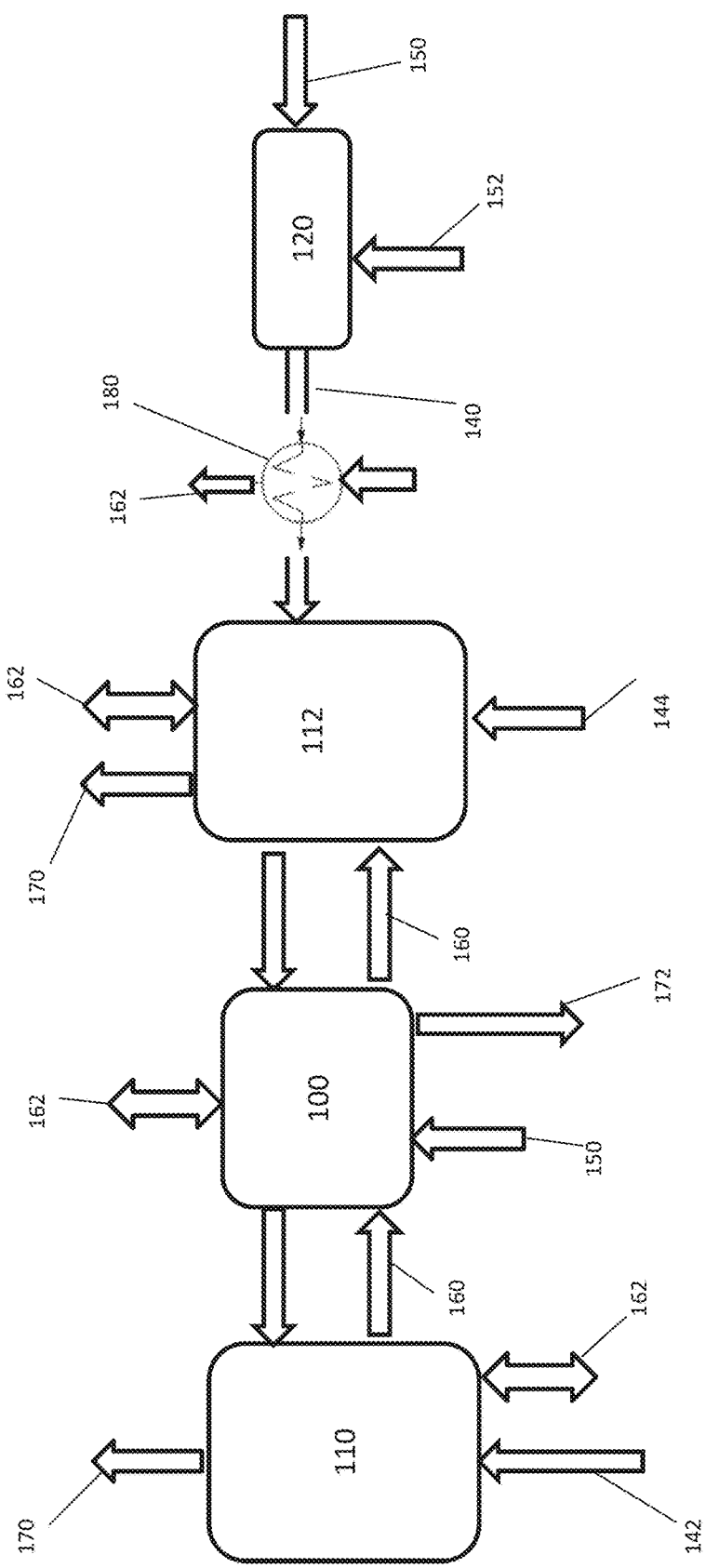
FIG. 2 is a box diagram of an alternate embodiment of a system for removing nitrogenous compounds.

FIG. 2 illustrates an alternative embodiment. The exemplary embodiment of FIG. 2 includes the addition of a heat exchanger 180 for cooling down the hot sulfur dioxide gases 140 from the sulfur burner. The heat exchanger 180 may cool gases by transferring a fraction of the heat 162 to a different fluid prior to conveying the gases to an absorption chamber 112.

Figure 3:
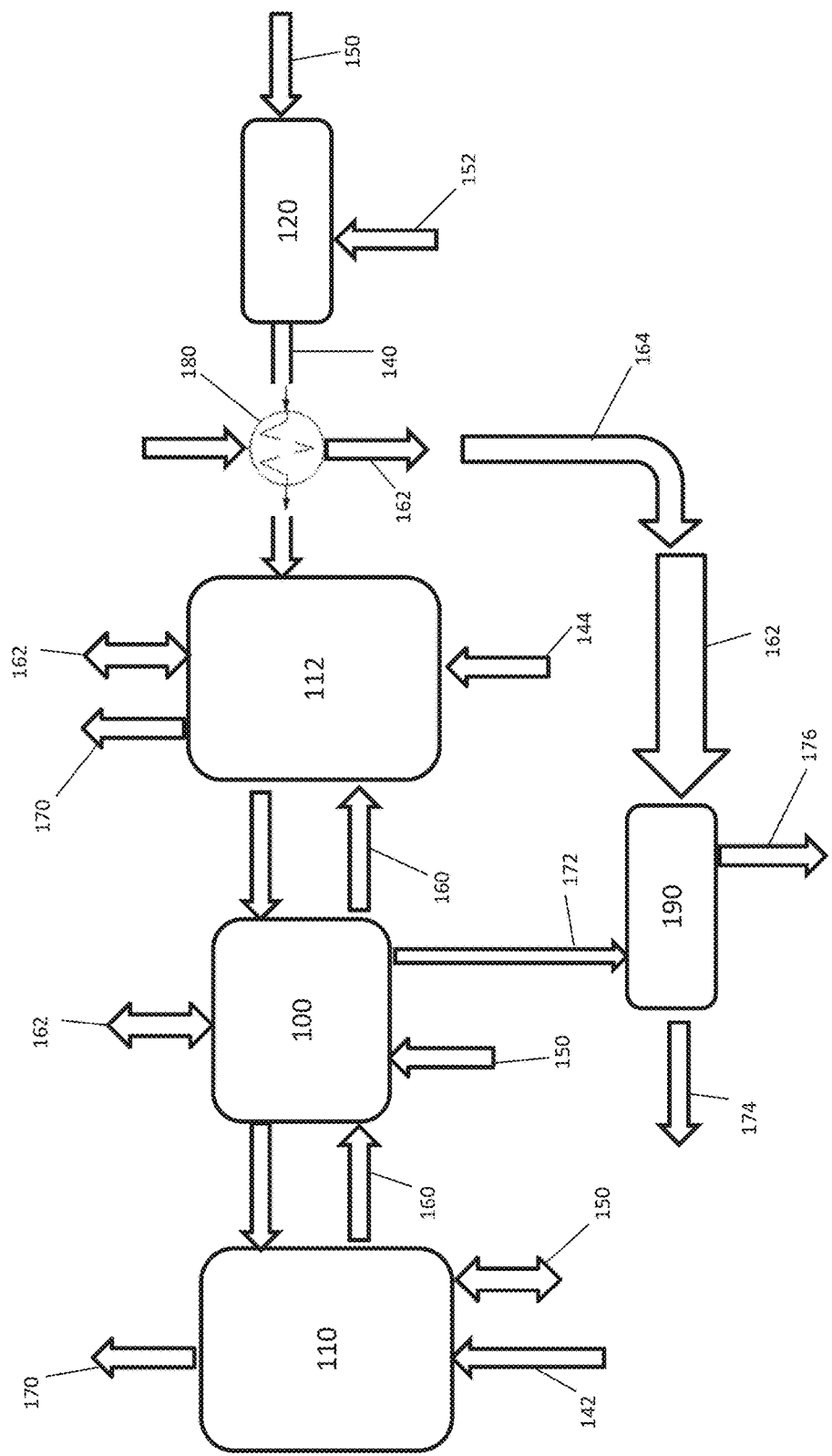
FIG. 3 is a box diagram of an alternate embodiment of a system for removing nitrogenous compounds.

FIG. 3 illustrates an alternative embodiment. The exemplary embodiment of FIG. 3 includes recovering and reusing the heat 162 from the hot sulfur dioxide gases 140. The heat recovered 164 from the hot sulfur dioxide gases 140 may be conveyed for reuse in an evaporator 190. The evaporator 190 may be used to concentrate the liquid effluent 172 withdrawn from the reaction subsystem 100. Alternative uses of the recovered heat 164 will be obvious to someone skilled in the art.

In some embodiments, a fraction of the liquid effluent 172 may be conveyed from the reaction subsystem 100 to the evaporator 190. In the evaporator 190, liquid may further be concentrated, producing two streams: a vapor stream 176 and a concentrated liquid stream 174. Heat recovered 164 from the sulfur burner 120 may be used to offset some or all of the heat demand of the evaporator 190.

FIG. 4 illustrates another embodiment. The exemplary embodiment of FIG. 4 includes the addition of a process to take the liquid effluent 172 from the reaction subsystem 100 and split it in two fractions: one fraction comprising solids 178, and another fraction consisting essentially of the liquid product 173. The solid liquid separation process may include sedimentation, filtration, centrifugation or other similar process. After the solid liquid separation, for example, in a solids-liquid separator 192, some of the liquid fraction 166 may be returned to the reaction subsystem 100, and some of the liquid fraction 173 may be used collected as product. Some of the solid fraction 168 may be returned to the reaction subsystem 100, while some of the solid fraction 178 may be removed from the system as product. In some embodiments, the solid fraction comprises essentially only dust particles collected from incoming gases. In such embodiments, no solid is generally returned to the reaction subsystem. In some embodiments, the solids retained may comprise biological flocs acting as catalyst of the oxidation process of sulfites and bisulfites. In some embodiments, the solids may comprise crystals of ammonium sulfite or sulfate salts, or other precipitates, such as calcium sulfate or iron oxides, formed from elements present in the water and the absorbed gases. The nature of the solids separated will generally depend on the design and operational conditions of the system and method.

In the exemplary embodiment of FIG. 4, the system may be operated in a manner by which a TDS concentration in the reaction subsystem exceeds 46% for the purpose of inducing the precipitation of crystals of ammonia and sulfur species (see, for example, equations (5) and (8) above). A fraction of the liquid 172 in the reaction subsystem 100 may be conveyed to a solids-liquid separation unit 192, which includes but is not limited to a sedimentation tank or a centrifuge. Two distinct fractions may be produced: one fraction 178 in which the majority of the solid crystals are retained, and a second fraction 173 in which the majority of the liquid is retained. The liquid fraction 166 may be conveyed back to the reaction subsystem 100 or used as a liquid product. A similar embodiment can be used when operating the system with a microbial culture and TDS concentration of less than 46% to avoid crystal formation. In such an embodiment, the solid liquid separation 192 may be used to retain and return the microorganisms to the reaction subsystem.

Figure 5:
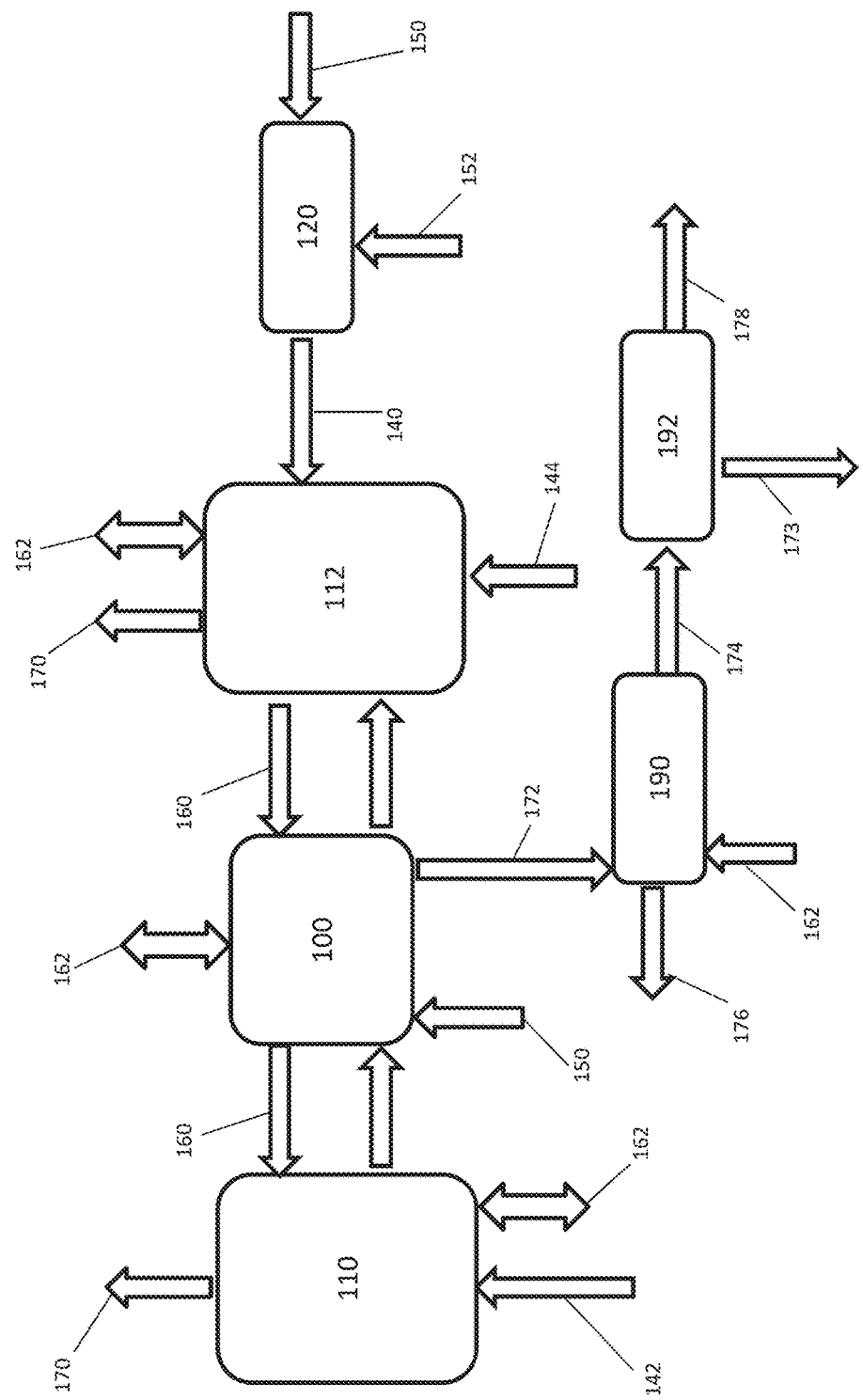
FIG. 5 is a box diagram of an alternate embodiment of a system for removing nitrogenous compounds.

FIG. 5 illustrates another embodiment. In the exemplary embodiment of FIG. 5, an evaporator 190 is used to remove vapor 176 and concentrate liquid product 174 prior to the solids-liquid separation 192.

Figure 6:
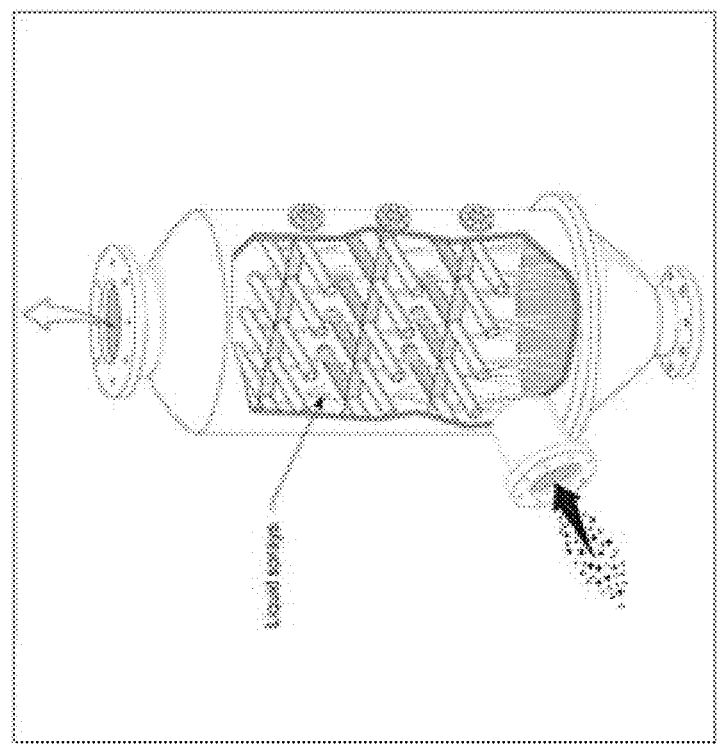
FIG. 6 is a schematic diagram of an absorption chamber, according to one embodiment.

In some embodiments, an evaporator 190 may be coupled to the reaction subsystem 100 and a fraction of the liquid 174 may be concentrated to a TDS concentration in excess of 46% in the evaporator 190. The evaporator 190 may induce crystal formation by concentrating the liquid fraction 174. The concentrated liquid 174 may be conveyed to a solids-liquid separation unit 192, which produces two streams: one stream 178 in which the majority of the crystals may be retained and a second stream 173 which may contain the majority of the liquid. FIG. 6 illustrates an exemplary spray tower that can be used for the absorption of gases and/or heat quenching, as shown in the absorption chambers 110, 112 of FIGS. 1 to 5. Many alternative absorption equipment designs may be used in configurations that would be obvious to a person skilled in the art.

Figure 7:
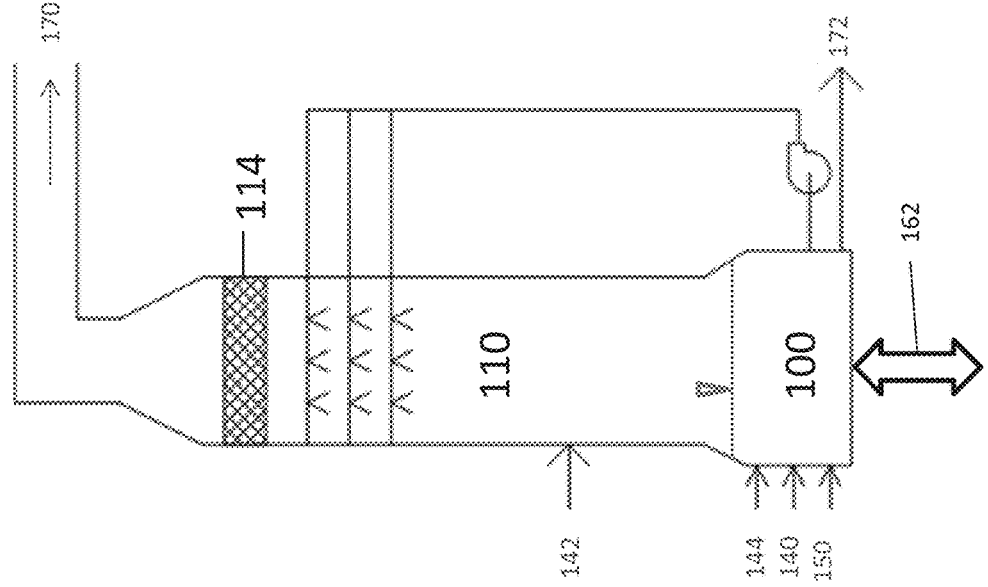
FIG. 7 is a schematic diagram of an absorption chamber, according to another embodiment.

FIG. 7 illustrates an exemplary vessel with an integrated absorption chamber 110 and reaction subsystem, where the absorption chamber 110 is a spray tower similar to the one presented in FIG. 6 and the reaction subsystem comprises a reaction tank 100 located in the lower portion of the vessel. The reaction tank 100 receives spray droplets coming from the absorption chamber 110 (absorption tower) above. The reaction tank 100 receives make up water 144, sulfur dioxide vapor 140, and an oxidant 150 (for example, air) directly. Alternatively, sulfur dioxide rich liquid instead of sulfur dioxide vapor 144 may be introduced into the reaction tank 100. Heat 162 could be added or removed from the reaction tank 100 in order to control the temperature of the liquid. A wet electrostatic precipitator 114 may be included in the vessel to eliminate mist.

Figure 8:
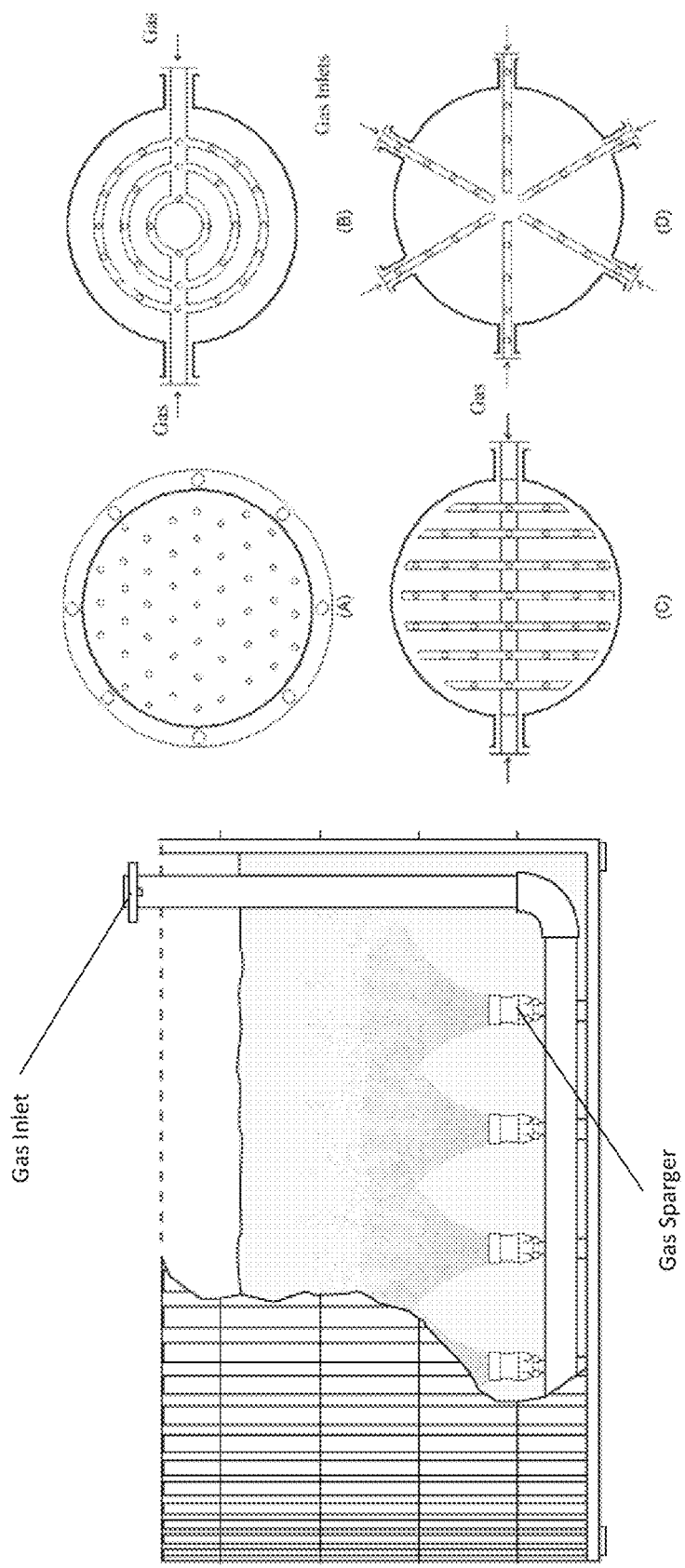
FIG. 8 is a schematic diagram of an absorption chamber, according to yet another embodiment.

FIG. 8 illustrates an alternative exemplary embodiment of a vessel with an absorption chamber. In the reaction subsystem of FIG. 8, a gas is sparged in a vessel (for example, a tank) containing liquid. The gas forms bubbles that move through the liquid transferring some or all of its gaseous content to the liquid. The gases not absorbed in the liquid are removed from the vessel. Some of the liquid contents evaporate and escape with the effluent gases. In some embodiments, some of the vapors of the sparged gas condense adding additional liquid to the vessel. The gases dissolved in the liquid may react with the liquid contents.

Figure 9:
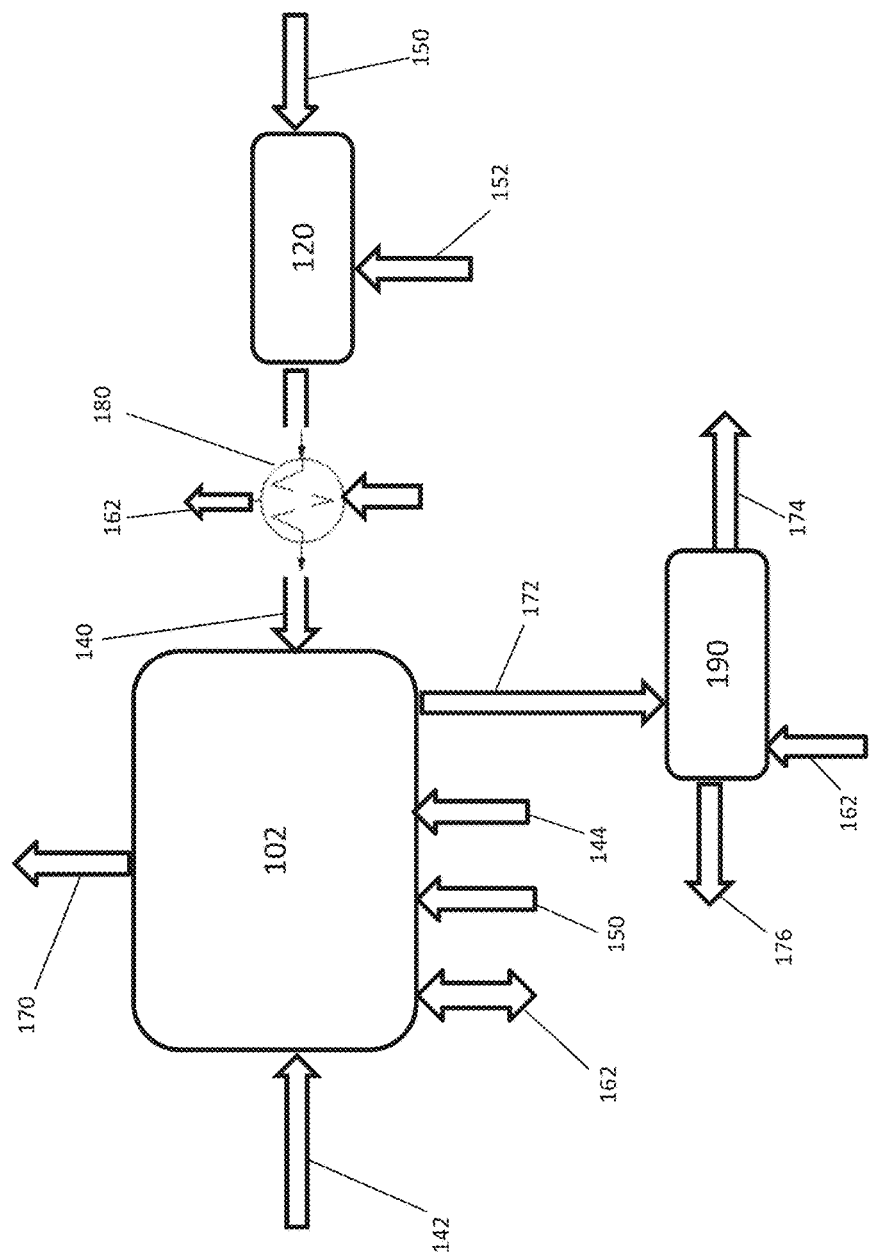
FIG. 9 is a box diagram of an alternate embodiment of a system for removing nitrogenous compounds.

FIG. 9 illustrates another embodiment. The exemplary embodiment of FIG. 9 includes an absorption chamber where the hot gases 140 from the sulfur burner 120 are conveyed directly to the reaction subsystem 102. The gases may be cooled down, removing some of the heat 162, to enable energy recovery.

In some embodiments, a single absorption chamber may be disposed in the reaction subsystem 102. In such embodiment the sulfur burner gas 140, which may contain sulfur dioxide, is combined with the gas with nitrogenous compounds 142 and the liquid 144 in a single absorption chamber. Air 150 and makeup water 144 may also be added to the single chamber for the purpose of controlling the process reactions. Heat 162 may be added or removed from the single chamber in order to control the rate of liquid evaporation from the chamber. A fraction of the liquid 172 in the absorption chamber may be removed as a product. The liquid 172 may be further concentrated to achieve a desired solids content using an evaporator 190. An exemplary spray tower absorption chamber which integrates absorption and reaction processes in a single chamber is illustrated in FIG. 7. An exemplary bubble column absorption chamber with gas spargers for the creation of fine bubbles for enhanced gas-liquid mass transfer is illustrated in FIG. 8.

Figure 10:
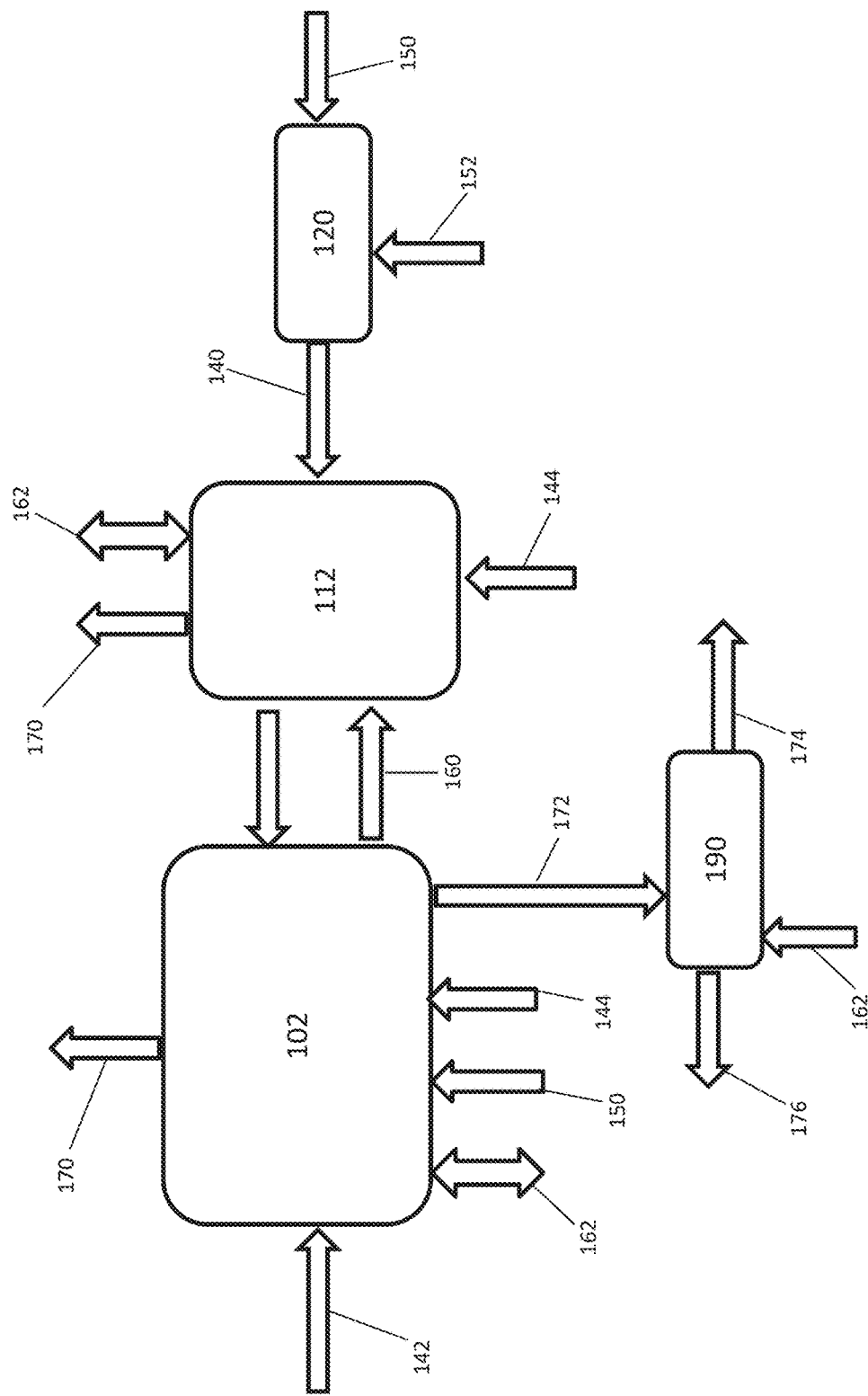
FIG. 10 is a box diagram of an alternate embodiment of a system for removing nitrogenous compounds.

FIG. 10 illustrates another embodiment. The exemplary embodiment of FIG. 10 includes a system where the aqueous sulfur gases 140 and liquid 144 actively exchange with the absorption chamber 112 using a separate reaction chamber 102. In some embodiments, the exemplary system of FIG. 10 is run with a low dissolved solids concentration. An additional evaporator 130 may be employed to concentrate the final product 174.

FIG. 11 illustrates another embodiment. The exemplary embodiment of FIG. 11 includes a source of an oxidant. The source of the oxidant may include a liquid product oxidation chamber 130. Other oxidants 150 could be used to fully convert sulfite and bisulfite to sulfate and to remove any odorous compounds. In some embodiments, a solid liquid separation unit 192 may be used to polish the final liquid product 173 or to return biologically active solids to the reaction vessel. When the system is run to produce crystals of sulfur and ammonia, the solid product 178 may include such crystals.

In some embodiments, the TDS concentration in the liquid in the absorption chamber 102 may be higher than 46%, thus inducing the formation of crystals. The contents of the absorption chamber 102 may be conveyed to a solids-liquid separation unit 192 to separate crystals 178 from a liquid fraction 173. The solid fraction 178 which contains the majority of the crystals may be removed from the system. The liquid fraction 173 may be returned to the absorption chamber 102 (as liquid return 166) or removed partially or totally from the system (as a product 173). An optional oxidation chamber 130 may be employed to further convert sulfite and bisulfite ions to sulfate, as shown in FIG. 11.

Figure 12:
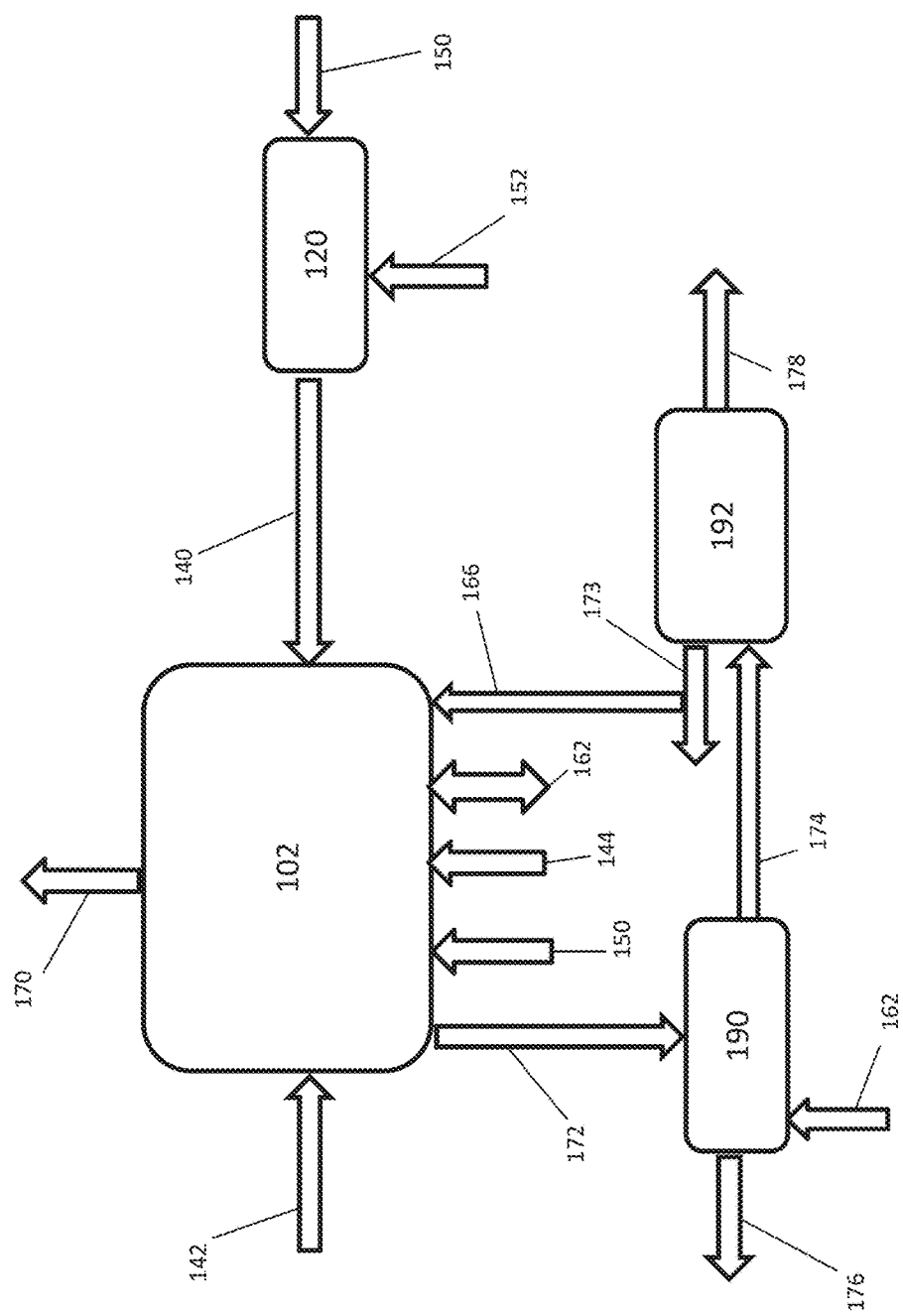
FIG. 12 is a box diagram of an alternate embodiment of a system for removing nitrogenous compounds.

FIG. 12 illustrates another embodiment. The exemplary embodiment of FIG. 12 includes an evaporator 190 prior to discharging and removing the solids 178 from liquid product 172. The evaporator 190 may be employed at this stage to further concentrate the solution 174.

In some embodiments, the system may comprise a liquid circulation loop to an evaporator 190. The liquid circulation loop may provide further control of the concentration of the TDS throughout the process. Liquid 172 from the absorption chamber 102 may be conveyed to the evaporator 190 to adjust the solids concentration within the evaporator 190. The concentrated liquid 174 may then be conveyed to the solids-liquid separation unit 192, where the majority of the crystals may be removed as a product 178 and the liquid fraction 166 may be returned to the absorption chamber 102. In this embodiment, the system could produce a liquid product 173, a crystal product 178, or a combination of both (for example, concentrated product 174) by controlling the operating conditions.

Figure 13:
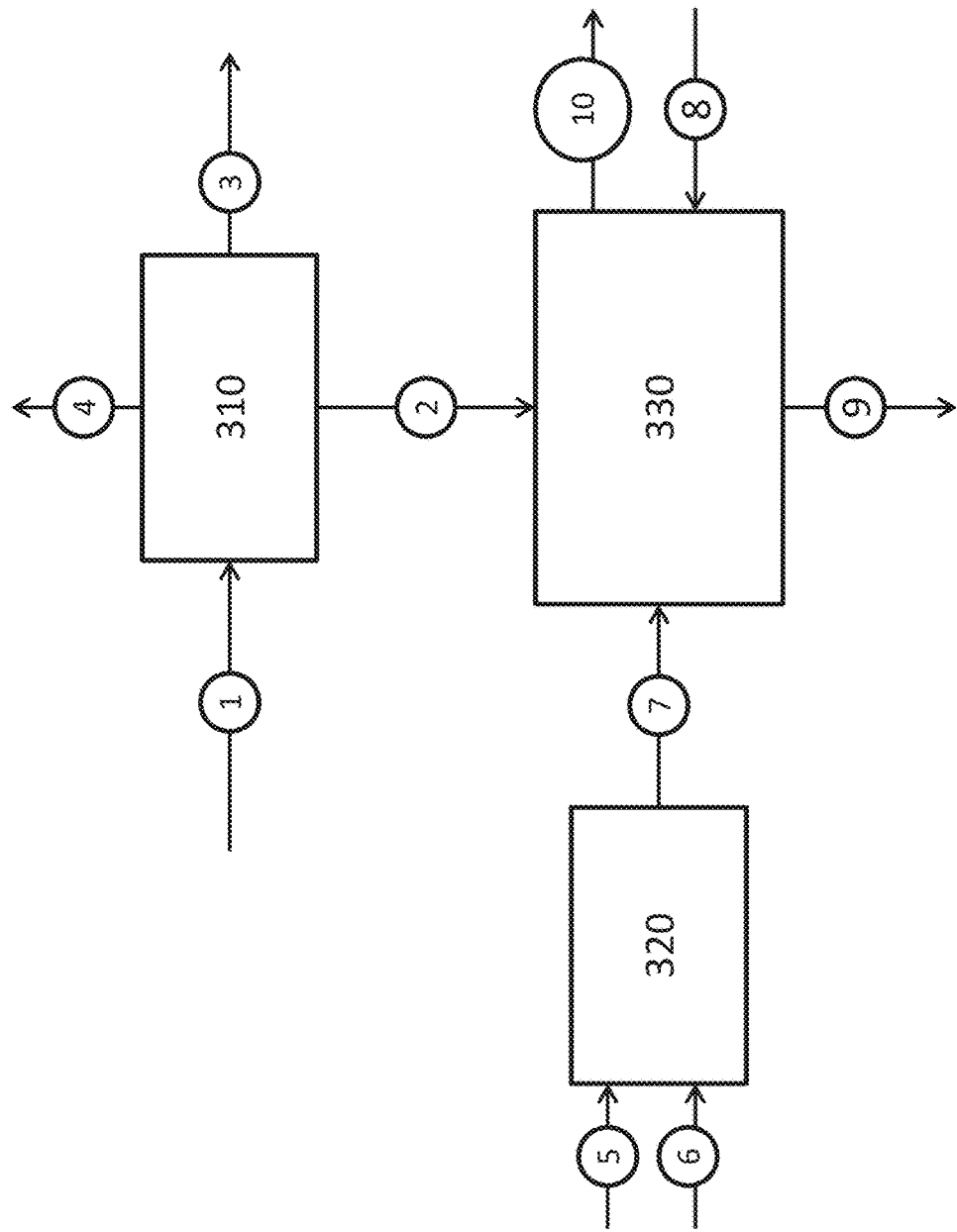
FIG. 13 is a flow diagram of a method for removing nitrogenous compounds from a gas stream, according to one embodiment.

FIG. 13 illustrates another embodiment. The exemplary embodiment of FIG. 13 illustrates a method where organic material feed 1 is dried 310 to produce a dried organic material 4 and a gas stream 2. Contaminants 3 are removed from the organic material gas stream 2. In the exemplary embodiment of FIG. 13, solid sulfur 5 is combined with oxygen 6 and burned 320 to produce a sulfur dioxide vapor 7. The sulfur dioxide vapor 7 is combined 330 with the gas stream 2 and oxidant (for example, air) 8. An ammonium sulfate product 9 containing nitrogenous compounds is produced by the combination 330. Treated vapors 10 are also produced by the combination 330.

In some embodiments, a drying process may be employed. The drying process may include a thermal drying or biodrying process, where wet hot gases laden with ammonia and other nitrogenous compounds may be generated. Such gases may be treated to remove ammonia and produce a fertilizer product.

Figure 14:
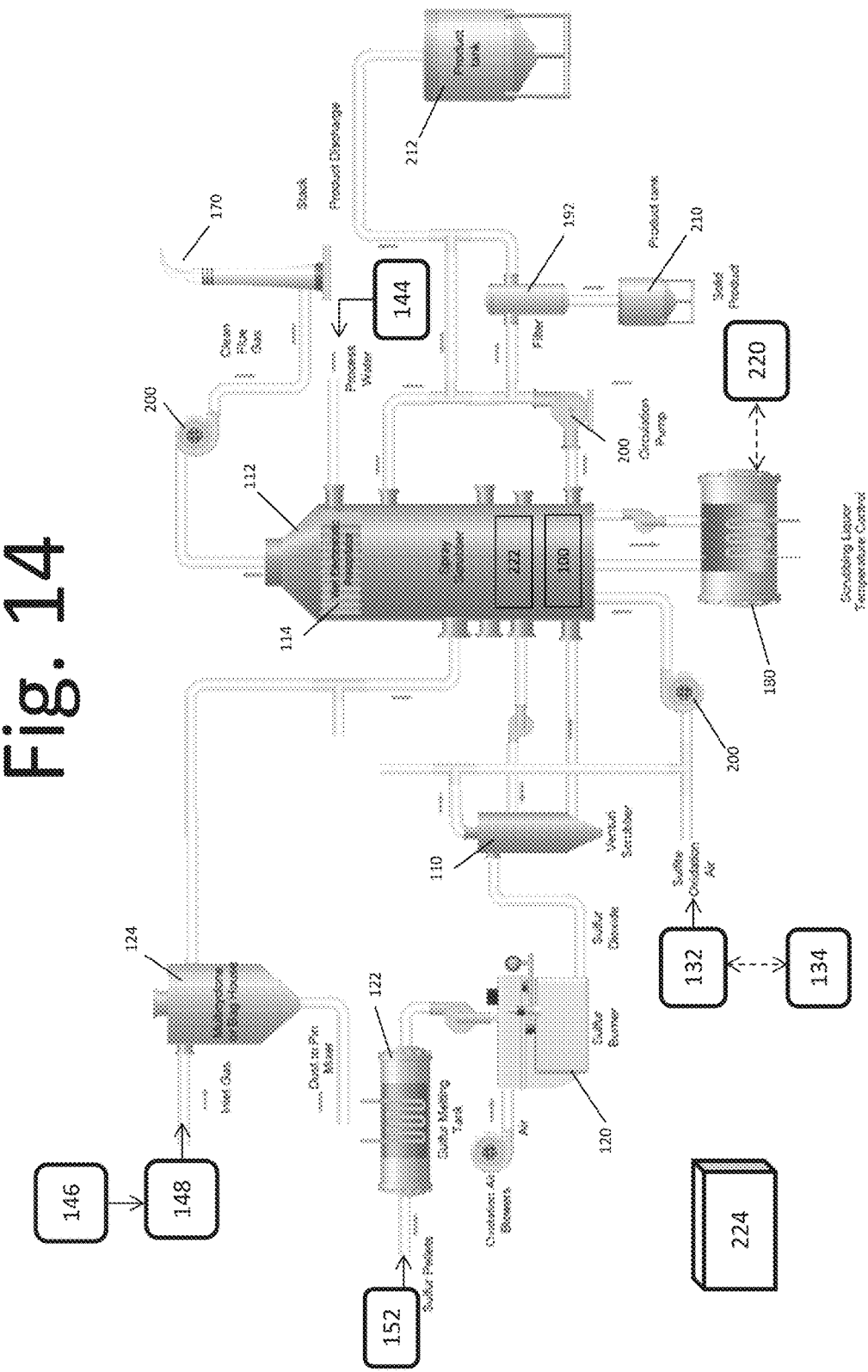
FIG. 14 is a schematic diagram of a system for removing nitrogenous compounds, according to one embodiment.

FIG. 14 illustrates another embodiment. The exemplary embodiment of FIG. 14 includes a spray scrubber 112 including a wet electrostatic precipitator 114 as an absorption chamber. A second absorption chamber is exemplified as a Venturi scrubber 110. In the exemplary embodiment of FIG. 14 nitrogenous flue gas is produced by drying organic material 146 (exemplary source of gas stream) in a dryer 148. Solid contaminants may be removed from the gas stream with a multicyclone 124 (an exemplary solids-gas separator). Solid sulfur pellets 152 may be melted in a sulfur melting tank 122 and burned in a sulfur burner 120 with air to produce sulfur dioxide (exemplary source of sulfur dioxide vapor). The sulfur dioxide may be combined with water 144 (exemplary source of water). The sulfur dioxide and gas stream may be combined in the two absorption chambers 112, 110. A temperature control subsystem 220 may provide temperature control to the scrubber 112. The sulfur dioxide and gas stream may be combined with an oxidant 132 (exemplary source of an oxidant). An oxidation control subsystem 134 may provide oxidation control to the scrubber 112. A sensor or meter 222 (for example, temperature sensor, pH meter, ORP sensor, or conductivity meter) may be configured to take measurements within the reaction subsystem, for example within absorption chamber 112. A control module 224 may be electrically connected to the sensor or meter 222, for example via one or more wires (not shown) or wirelessly. Liquid product may be removed from the scrubber and filtered, for example in filter 192, to produce a solid product fraction and a liquid product fraction. Each product may be stored in a corresponding tank 210, 212. Treated air 170 may be discharged through a clean flue gas stack. Several pumps 200 may be employed to direct process gases and air through the system.

FIG. 15 is a graph of the distribution of the ionized forms of sulfurous acid at various pHs. In accordance with certain embodiments, the pH of a solution within the system may be controlled to a value as shown in FIG. 15 to produce a desired sulfurous acid ion. For example, the pH may be maintained above 5, such that sulfurous acid ions (for example, $SO_3^{-2}$ and $HSO_3^{-}$) are both present in the product.

EXAMPLE

Nitrogenous Gas Stream from Chicken Manure

A bench scale test was run to process the manure of chickens. Full scale results were estimated based on results obtained from the bench scale experiment. The results are presented in Table 1 (in tons per day). The full scale results were confirmed in a pilot test processing the manure of two million chickens. The bench scale test was organized and run as shown in FIG. 13.

TABLE 1

| | Chicken Manure | | | | | | | |
|---|---|---|---|---|---|---|---|---|
| | Total mass (tpd) | TDS (tpd) | Solids (tpd) (not including N, P, K, S) | Water (tpd) | Total N (tpd) | Phosphate $P_2O_3$ (tpd) | Potassium $K_2O$ (tpd) | Sulfur S (tpd) |
| Feed (1) | 318 | 95 | 80 | 222 | 7.3 | 3.4 | 4.8 | 0.3 |
| Dried Organic Material (4) | 100 | 90 | 80 | 10.0 | 3.65 | 3.13 | 4.42 | 0.32 |
| Loss (3) | 23.0 | 0.8 | 0.0 | 22.2 | 0.1 | 0.24 | 0.33 | 0.02 |
| Gas Stream (2) | 5400 | — | — | 190 | 3.5 | — | — | — |
| Sulfur (5) | 4.2 | — | — | — | — | — | — | 4.2 |
| Oxygen (6) | 4.2 | — | — | — | — | — | — | — |
| Sulfur Dioxide (7) | 8.5 | — | — | — | — | — | — | — |
| Air (8) | 48 | — | — | — | — | — | — | — |
| Ammonium Sulfate Product (9) | 42 | 16 | — | 26 | 3.3 | — | — | 3.8 |
| Treated Vapors (10) | 5613 | 0.8 | — | 164 | 0.2 | — | — | 0.20 |

Briefly, 318 tons per day of wet organic material feed are supplied to the system. The organic material feed contains 7.3 tons of nitrogen. About 100 tons per day of dried organic material is produced from drying the feed. Most of the phosphate and potassium contained in the organic material feed remain in the dried organic product. About 23 tons per day are lost during the drying material. About 5400 tons per day of nitrogenous gas stream are produced by the drying process. The gas stream contains about 3.5 tons of nitrogen, indicating that close to half of the nitrogen is evaporated to the gas stream during the drying process. Sulfur and oxygen are added in equal amounts to the burner, at about 4.2 tons per day, to produce 8.5 tons of sulfur dioxide per day. The sulfur dioxide may be used to recover 3.3 tons of nitrogen per day (8% nitrogen) from the gas vapors in the form of an ammonium sulfate product. The ammonium sulfate product further contains about 3.8 tons per day of sulfur (9% sulfur). The ammonium sulfate product contains less than 1% phosphate and potassium. Treated vapors released to the environment contain about 0.2 tons per day of nitrogen and about 0.2 tons per day of sulfur. Treated vapors have less than 1% nitrogen, phosphate, potassium, and sulfur.

Thus, the system may be used for recovering nitrogen from gases containing ammonia to produce a useful product that can be reused in agricultural applications. Furthermore, the systems and processes described herein may produce a treated vapor comprising less than 1% contaminants.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed. For example, those skilled in the art may recognize that the method and components thereof, according to the present disclosure, may further comprise a network or systems or be a component of a system for recovering nitrogen from a gas stream. It is therefore to be understood that the embodiments described herein are presented by way of example only and that, within the scope of the appended claims and equivalents thereto; the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve recovering nitrogen from a gas stream. Accordingly the foregoing description and figures are by way of example only. Further the depictions in the figures do not limit the disclosures to the particularly illustrated representations.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While exemplary embodiments of the disclosure have been disclosed, many modifications, additions, and deletions may be made therein without departing from the spirit and scope of the disclosure and its equivalents, as set forth in the following claims.

What is claimed is:

1. A method of producing a treated gas by removing nitrogenous compounds from a gas stream, the method comprising:
   introducing sulfur dioxide vapor into water to produce aqueous sulfurous acid;
   introducing the aqueous sulfurous acid into a gas stream comprising nitrogenous compounds to produce ammonium ions, sulfurous acid ions, a nitrogenous liquid, and the treated gas; and
   maintaining a pH of the aqueous sulfurous acid and the nitrogenous liquid above 5.

2. The method of claim 1, further comprising diluting the aqueous sulfurous acid with water.

3. The method of claim 1, further comprising maintaining a pH of the aqueous sulfurous acid and the nitrogenous liquid between about 5 and about 7.

4. The method of claim 1, further comprising drying organic material to produce the gas stream comprising nitrogenous compounds.

5. The method of claim 4, further comprising separating solids from the gas stream.

6. The method of claim 4, wherein the organic material comprises at least one of poultry manure, poultry litter, and sewage sludge.

7. The method of claim 1, further comprising burning elemental sulfur in the presence of oxygen to produce the sulfur dioxide vapor.

8. The method of claim 7, further comprising maintaining a temperature of the aqueous sulfurous acid and the nitrogenous liquid between about 15° C. and about 80° C.

9. The method of claim 1, wherein the treated gas comprises less than 1% nitrogen, sulfur, phosphate, and potassium.

10. A method of recovering ammonia from a gas stream, the method comprising:
    introducing sulfur dioxide vapor into water to produce aqueous sulfurous acid;
    introducing the aqueous sulfurous acid into a gas stream comprising nitrogenous compounds to produce ammonium ions, sulfurous acid ions, and a nitrogenous liquid;
    introducing an oxidant into the aqueous sulfurous acid or the nitrogenous liquid to oxidize a predetermined amount of the sulfurous acid ions to sulfate ions; and
    collecting the nitrogenous liquid comprising remaining sulfurous acid ions, the ammonium ions, and the sulfate ions.

11. The method of claim 10, wherein the predetermined amount of the sulfurous acid ions is between about 5% and about 50% of the sulfurous acid ions.

12. The method of claim 10, further comprising maintaining a concentration of total dissolved solids in the nitrogenous liquid below about 46%.

13. The method of claim 12, wherein the nitrogenous liquid comprises at least 8% nitrogen and at least 9% sulfur by mass.

14. The method of claim 12, wherein the nitrogenous liquid comprises less than 1% phosphate and potassium.

15. The method of claim 10, further comprising maintaining a concentration of total dissolved solids in the nitrogenous liquid above about 46%, whereby the sulfate ions and the ammonium ions precipitate to form ammonium sulfate crystals.

16. The method of claim 15, further comprising collecting the ammonium sulfate crystals.

17. The method of claim 10, further comprising maintaining a pH of the aqueous sulfurous acid and the nitrogenous liquid between about 2 and about 9.

18. The method of claim 17, further comprising maintaining a pH of the aqueous sulfurous acid and the nitrogenous liquid between about 5 and about 7.

19. The method of claim 10, further comprising dosing the aqueous sulfurous acid or the nitrogenous liquid with a biological catalyst.

20. The method of claim 10, further comprising drying organic material to produce the gas stream comprising nitrogenous compounds.

21. The method of claim 20, further comprising separating solids from the gas stream.

22. The method of claim 20, wherein the organic material comprises at least one of poultry manure, poultry litter, and sewage sludge.

23. The method of claim 10, further comprising burning elemental sulfur in the presence of oxygen to produce the sulfur dioxide vapor.

24. The method of claim 23, further comprising maintaining a temperature of the aqueous sulfurous acid and the nitrogenous liquid between about 15° C. and about 80° C.

25. A system for removing nitrogenous compounds from a gas stream, the system comprising:
   a source of sulfur dioxide vapor;
   a source of a gas stream comprising nitrogenous compounds;
   a source of water;
   a source of an oxidant;
   a reaction subsystem comprising at least one absorption chamber, a treated gas outlet, and a product outlet, the reaction subsystem fluidly connected to the source of the sulfur dioxide vapor, the source of the gas stream, the source of the water, and the source of the oxidant, and constructed and arranged to combine the sulfur dioxide vapor, the gas stream, the water, and the oxidant;
   a solids-liquid separator fluidly connected downstream of the reaction subsystem through the product outlet, the solids-liquid separator comprising a solid product outlet and liquid product outlet;
   a temperature control subsystem configured to maintain a predetermined temperature range within the reaction subsystem;
   an oxidation control subsystem configured to maintain a predetermined oxidation reduction potential (ORP) within the reaction subsystem; and
   a recirculation line extending between the at least one absorption chamber and a recycle inlet of the reaction subsystem, the recirculation line constructed and arranged to reintroduce water vapor and residual gases not absorbed in the at least one absorption chamber to the reaction subsystem.

26. The system of claim 25, wherein the temperature control subsystem comprises a temperature sensor.

27. The system of claim 26, wherein the temperature control subsystem comprises a control module electrically connected to the temperature sensor and configured to adjust a temperature within the reaction subsystem responsive to a measurement obtained by the temperature sensor.

28. The system of claim 25, wherein the temperature control subsystem comprises a heat exchanger constructed and arranged to transfer heat between the reaction subsystem and one or more of the source of the sulfur dioxide vapor, the source of the gas stream, and the source of the water.

29. The system of claim 25, wherein the predetermined temperature range is between about 15° C. and about 80° C.

30. The system of claim 25, further comprising a pH meter configured to measure pH of a solution within the reaction subsystem.

31. The system of claim 30, further comprising a control module electrically connected to the pH meter and configured to adjust the pH within the reaction subsystem responsive to a measurement obtained by the pH meter.

32. The system of claim 31, wherein the control module is configured to maintain the pH above 5.

33. The system of claim 32, wherein the control module is configured to maintain the pH between about 5 and about 7.

34. The system of claim 25, further comprising an ORP sensor configured to measure ORP of a solution within the reaction subsystem.

35. The system of claim 34, further comprising a control module electrically connected to the ORP sensor and configured to adjust the ORP within the reaction subsystem responsive to a measurement obtained by the ORP sensor.

36. The system of claim 25, wherein the predetermined ORP is between about +400 mV and about +900 mV.

37. The system of claim 25, further comprising a conductivity meter configured to measure conductivity of a gas or solution within the reaction subsystem.

38. The system of claim 37, further comprising a control module electrically connected to the conductivity meter and configured to adjust the conductivity of the gas or the solution within the reaction subsystem responsive to a measurement obtained by the conductivity meter.

39. The system of claim 38, wherein the control module is configured to maintain a concentration of total dissolved solids in the solution within the reaction subsystem below about 46%.

40. The system of claim 38, wherein the control module is configured to maintain a concentration of total dissolved solids in the solution within the reaction subsystem above about 46%.

41. The system of claim 25, wherein the source of the sulfur dioxide vapor comprises a sulfur burner.

42. The system of claim 25, wherein the source of the gas stream comprises an organic material dryer and a solids-gas separator comprising a solids waste outlet and a gas stream outlet, and the source of the gas stream is fluidly connected to the reaction subsystem through the gas stream outlet of the solids-gas separator.

43. The system of claim 25, further comprising a wet electrostatic precipitator positioned within the at least one absorption chamber.

44. The system of claim 25, further comprising an evaporator fluidly connected downstream of the reaction subsystem through the product outlet and upstream of the solids-liquid separation unit.

* * * * *